United States Patent
Timans

(10) Patent No.: US 8,157,439 B2
(45) Date of Patent: Apr. 17, 2012

(54) METHODS FOR DETERMINING WAFER TEMPERATURE

(75) Inventor: Paul Janis Timans, Mountain View, CA (US)

(73) Assignee: Mattson Technology, Inc., Fremont, CA (US)

( * ) Notice: Subject to any disclaimer, the term of this patent is extended or adjusted under 35 U.S.C. 154(b) by 99 days.

(21) Appl. No.: 12/480,400

(22) Filed: Jun. 8, 2009

(65) Prior Publication Data

US 2009/0245320 A1    Oct. 1, 2009

Related U.S. Application Data

(63) Continuation of application No. 11/478,312, filed on Jun. 29, 2006, now Pat. No. 7,543,981.

(51) Int. Cl.
*G01G 5/00* (2006.01)
*G01K 17/08* (2006.01)
*G01K 11/00* (2006.01)

(52) U.S. Cl. ............... 374/129; 374/2; 374/161; 374/5; 374/1; 356/43; 250/338.1; 702/99

(58) Field of Classification Search ............. 374/1, 2, 374/4, 43, 44, 45, 100, 121, 120, 124, 126, 374/129, 137, 161, 166, 178, 132, 131; 327/512, 327/513; 702/99; 250/338.1, 227.14, 340–341.8, 250/252.1; 356/43, 216, 432, 933, 939; 324/750.01, 324/750.02, 754.01, 754.21, 754.23; 438/7, 438/14, 16

See application file for complete search history.

(56) References Cited

U.S. PATENT DOCUMENTS

| | | | |
|---|---|---|---|
| 3,623,813 A | 11/1971 | Hacman | |
| 3,672,221 A | 6/1972 | Weil | |
| 4,062,623 A | 12/1977 | Suzuki et al. | |
| 4,342,907 A | 8/1982 | Macedo et al. | |
| 4,448,524 A | 5/1984 | Brus et al. | |
| 4,468,136 A | 8/1984 | Murphy et al. | |
| 4,596,466 A | 6/1986 | Ulrich | |

(Continued)

FOREIGN PATENT DOCUMENTS

WO    00/73533 A1    12/2000

OTHER PUBLICATIONS

M. E. Adel et al., *Noncontact temperature monitoring of semiconductors by optical absorption edge sensing*, Proc. SPIE 1803, 290 (1992).

(Continued)

*Primary Examiner* — Gail Verbitsky

(74) *Attorney, Agent, or Firm* — Dority & Manning, P.A.

(57) ABSTRACT

Methods and apparatus for wafer temperature measurement and calibration of temperature measurement devices may be based on determining the absorption of a layer in a semiconductor wafer. The absorption may be determined by directing light towards the wafer and measuring light reflected from the wafer from below the surface upon which the incident light impinges. Calibration wafers and measurement systems may be arranged and configured so that light reflected at predetermined angles to the wafer surface is measured and other light is not. Measurements may also be based on evaluating the degree of contrast in an image of a pattern in or on the wafer. Other measurements may utilize a determination of an optical path length within the wafer alongside a temperature determination based on reflected or transmitted light.

26 Claims, 24 Drawing Sheets

U.S. PATENT DOCUMENTS

| | | | |
|---|---|---|---|
| 4,756,627 A | 7/1988 | Nelson | |
| 4,867,565 A | 9/1989 | Lequime | |
| 4,890,933 A | 1/1990 | Amith et al. | |
| 5,098,199 A | 3/1992 | Amith | |
| 5,102,231 A | 4/1992 | Loewenstein et al. | |
| 5,118,200 A | 6/1992 | Kirillov et al. | |
| 5,208,643 A | 5/1993 | Fair | |
| 5,229,303 A | 7/1993 | Donnelly, Jr. et al. | |
| 5,255,286 A | 10/1993 | Moslehi et al. | |
| 5,263,776 A | 11/1993 | Abraham et al. | |
| 5,381,229 A | 1/1995 | Murphy et al. | |
| 5,388,909 A | 2/1995 | Johnson et al. | |
| 5,467,732 A | 11/1995 | Donnelly, Jr. et al. | |
| 5,572,314 A | 11/1996 | Hyman, Jr. et al. | |
| 5,628,564 A | 5/1997 | Nenyei et al. | |
| 5,683,180 A | 11/1997 | De Lyon et al. | |
| 5,727,017 A | 3/1998 | Maurer et al. | |
| 5,754,294 A | 5/1998 | Jones et al. | |
| 5,773,316 A | 6/1998 | Kurosaki et al. | |
| 5,841,110 A | 11/1998 | Nenyei et al. | |
| 5,874,711 A | 2/1999 | Champetier et al. | |
| 5,997,175 A | 12/1999 | Champetier et al. | |
| 6,027,244 A | 2/2000 | Champetier et al. | |
| 6,034,357 A | 3/2000 | Guardado | |
| 6,054,868 A | 4/2000 | Borden et al. | |
| 6,056,434 A | 5/2000 | Champetier et al. | |
| 6,062,729 A | 5/2000 | Ni et al. | |
| 6,082,892 A | 7/2000 | Adel et al. | |
| 6,116,779 A | 9/2000 | Johnson et al. | |
| 6,151,446 A | 11/2000 | Hunter et al. | |
| 6,160,242 A | 12/2000 | Guardado | |
| 6,191,392 B1 | 2/2001 | Hauf et al. | |
| 6,200,023 B1 | 3/2001 | Tay et al. | |
| 6,204,484 B1 | 3/2001 | Tay et al. | |
| 6,239,590 B1 * | 5/2001 | Krivy et al. | 324/750.02 |
| 6,293,696 B1 | 9/2001 | Guardado | |
| 6,359,263 B2 | 3/2002 | Tay et al. | |
| 6,369,363 B2 | 4/2002 | Hauf et al. | |
| 6,398,406 B1 | 6/2002 | Breiland et al. | |
| 6,403,923 B1 | 6/2002 | Tay et al. | |
| 6,426,232 B1 | 7/2002 | Litvak | |
| 6,462,315 B2 | 10/2002 | Hauf | |
| 6,541,287 B2 | 4/2003 | Ino et al. | |
| 6,654,132 B1 | 11/2003 | Schietinger et al. | |
| 6,835,914 B2 | 12/2004 | Timans | |
| 6,840,667 B2 | 1/2005 | Schlagheck et al. | |
| 6,891,124 B2 | 5/2005 | Denton et al. | |
| 7,009,695 B2 | 3/2006 | Some | |
| 7,015,422 B2 | 3/2006 | Timans | |
| 7,056,389 B2 | 6/2006 | Hauf et al. | |
| 7,112,763 B2 | 9/2006 | Hunter et al. | |
| 7,135,656 B2 | 11/2006 | Timans | |
| 7,169,717 B2 | 1/2007 | Merkl et al. | |
| 7,234,862 B2 | 6/2007 | Johnson et al. | |
| 7,452,125 B2 * | 11/2008 | Volf et al. | 374/1 |
| 2001/0014111 A1 | 8/2001 | Shimizu | |
| 2003/0236642 A1 | 12/2003 | Timans | |
| 2004/0028113 A1 | 2/2004 | Schlagheck et al. | |
| 2005/0008351 A1 | 1/2005 | Gat et al. | |
| 2005/0063453 A1 | 3/2005 | Camm et al. | |
| 2005/0259716 A1 | 11/2005 | Ito et al. | |
| 2005/0271116 A1 | 12/2005 | Ito et al. | |
| 2006/0077394 A1 | 4/2006 | Suzuki et al. | |
| 2006/0152734 A1 | 7/2006 | Suzuki et al. | |
| 2009/0004763 A1 * | 1/2009 | Ono et al. | 438/7 |

OTHER PUBLICATIONS

K. L. Saenger et al., *Wavelength-modulated interferometric thermometry for improved substrate temperature measurement*, Rev. Sci Instrum. 63, 3862 (1992).

R. Steins et al., *Use of SiC band gap temperature dependence for absolute calibration of emissivity corrected pyrometers in III-nitride MOVPE*, J. Crystal Growth 272, 81(2004).

M. K. Weilmeier et al., *A new optical temperature measurement technique for semiconductor substrates in molecular beam epitaxy*, Can J. Phys. 69, 422 (1991).

C. W. Cullen et al., *Temperature measurement of metal-coated silicon wafers By double-pass infrared transmission*, IEEE Trans Semiconductor Manufacturing 8, 346 (1995).

D. Peyton et al., *Systems-oriented survey of non-contact temperature measurement techniques for rapid thermal processing*, Proc. SPIE 1393, 295 (1990).

"Influence of temperature and backside roughness on the emissivity of Si wafers during rapid thermal processing"; Authors, Vandenabelle and Maex in J. Appl. Phys. vol. 72, No. 12, (Dec. 15, 1992), pp. 5867-5875.

"Infrared absorption in silicon at elevated temperatures"; Authors, Rogne et al.; Published in Appl. Phys. Lett. 69, pp. 2190-2192 (Oct. 7, 1996).

"The Thermal Radiative Properties of Semiconductors" in the book "Advances in Rapid Thermal and Integrated Processing", edited by F. Roozeboom (Kluwer Academic Publishers, Dordrecht, Netherlands, 1995) p. 35.

"A new optical temperature measurement technique for semiconductor substrates in molecular beam epitaxy", Authors, Weilmeier et al.; Published, Can. J. Phys. vol. 69, 1991, pp. 422-426.

"Use of SiC band gap temperature dependence for absolute calibration of emmisivity corrected pyrometers in III-nitride MOVPE"; Authors, R. Steins et al.; Published, Journal of Crystal Growth 272 (2004), pp. 81-86.

"Temperature Measurement of Metal-Coated Silicon Wafers by Double-Pass Infrared Transmission"; Authors, Cullen at al. (IEEE Trans. Semiconductor Manufacturing 8, 346 (1995).

* cited by examiner (a) { Slab with temperature dependent optical thickness and absorption }

(b) {
Layer with temperature dependent optical thickness

Layer with temperature dependent optical absorption
}

(c) {
Layer with temperature dependent optical thickness

Separation Layer

Layer with temperature dependent optical absorption
}

Figure 19

METHODS FOR DETERMINING WAFER TEMPERATURE

RELATED APPLICATIONS

The present application is a continuation application of U.S. patent application Ser. No. 11/478,312 which was filed on Jun. 29, 2006.

BACKGROUND INFORMATION

A thermal processing chamber as used herein refers to a device that rapidly heats objects, such as semiconductor wafers. Such devices typically include a substrate holder for holding one or more semiconductor wafers or other objects and an energy source for heating the wafers, such as heating lamps and/or an electrical resistance heater. During heat treatment, the semiconductor wafers are heated under controlled conditions according to a preset temperature regime.

Many semiconductor heating processes require a wafer to be heated to high temperatures so that various chemical and physical transformations can take place as the wafer is fabricated into a device. During rapid thermal processing, for instance, semiconductor wafers are typically heated by an array of lights to temperatures from about 300° C. to about 1,200° C., for times that are typically less than a few minutes. During these processes, one main goal is to heat the wafers as uniformly as possible.

During the rapid thermal processing of a semiconductor wafer, it is desirable to monitor and control the wafer temperature. In particular, for all of the high temperature wafer processes of current and foreseeable interest, it is important that the true temperature of the wafer be determined with high accuracy, repeatability and speed. The ability to accurately measure the temperature of a wafer has a direct payoff in the quality and size of the manufactured integrated circuit.

One of the most significant challenges in wafer heating systems is the ability to measure accurately the temperature of substrates during the heating process. In the past, various means and devices for measuring the temperature of substrates in thermal processing chambers have been developed. Such devices include, for instance, pyrometers, thermocouples that directly contact the substrate or that are placed adjacent to the substrate, and the use of laser interference.

In order to use pyrometers in a thermal processing chamber, the pyrometers generally need to be calibrated. Consequently, various calibration procedures currently exist to align the temperature readings of the pyrometers with an absolute and accurate temperature reference. One widely used method to calibrate pyrometers in thermal processing chambers is to place in the chambers a semiconductor wafer having a thermocouple embedded in the wafer. The temperature measurements taken from the thermocouple are compared with the temperature readings received from the temperature measuring devices and any discrepancy is calibrated out.

Although this method is well suited to calibrating temperature measuring device, such as pyrometers, it requires a substantial amount of time to calibrate the instruments. As such, a need currently exists for a method of calibrating pyrometers in thermal processing chambers very rapidly without creating a substantial amount of down time. In particular, a need exists for a method of calibrating pyrometers in thermal processing chambers without having to open the chamber, in order to maintain chamber integrity and purity. A need also exists for a simple method for calibrating pyrometers in thermal processing chambers that can be used routinely as a regular check to verify that the optical pyrometry system is properly functioning.

Furthermore, a need exists for a method of measuring temperature and calibrating pyrometers in thermal processing chambers that can be used across a range of temperatures, including for accurate high-temperature measurement and/or calibration.

SUMMARY

A method of calibrating a temperature measurement device can include directing an incident ray of light towards a first side of a calibration wafer, detecting light energy comprising at least one ray of light that has traversed a path within the wafer and has been reflected at a reflective plane, the reflective plane being distinct from the first side of the calibration wafer, determining the absorption of the wafer based on the detected energy, determining the temperature of the wafer based on the absorption, and calibrating a temperature measurement device based on the determined temperature. For instance, the reflective plane may comprise an interface between two layers of the wafer, a layer between two layers of the wafer, a gap between two layers of the wafer, the second or back side of the wafer, and may comprise a pattern or diffraction grating.

Detecting light energy can include detecting at least one ray of light that has exited the first side of the calibration wafer at a predetermined angle. The incident ray may be directed at an angle of incidence and a plane-of-polarization selected to minimize the surface reflectivity of the wafer.

The wafer may comprise an absorbing layer and a substrate, and the absorbing layer and substrate may be selected from materials having differing refractive indices at the wavelength of the incident ray of light such that the reflective plane is disposed at the interface of the absorbing layer and the substrate. Alternatively, the wafer can comprise at least one additional layer between the absorbing layer and the substrate, with the reflective plane defined at the additional layer. The absorbing layer and the substrate can both comprise silicon, with the additional layer comprising silicon dioxide, although other materials are suitable for any of the layers.

The wafer can comprise a grating at the interface between the absorbing layer and the substrate, with the grating defining the reflective plane. The detected light energy may then comprise light that has been diffracted by the grating.

The first side of the wafer can comprise an anti-reflection coating, and the wafer may also comprise a reflection enhancing layer or coating, the reflection enhancing layer defining the reflective plane.

The wafer may include a gap between the absorbing layer and substrate, the gap defining the reflective plane.

The wafer can also include a textured front side.

The wafer may be configured so that the reflective plane and a first side of the wafer are inclined relative to one another. For instance, the absorbing layer may be constructed so that the first surface of the absorbing layer is not parallel to the back surface, or the absorbing layer may be positioned atop another layer having a tapered shape.

The directed light may be emitted using a narrowband source or a broadband source, or may alternatively comprise other electromagnetic energy.

One or more optical elements may be configured and arranged to direct a selected portion of the light energy reflected from the wafer into at least one detector and/or selected portions of reflected light away from the detector.

The detector(s) may be positioned to detect light reflected from the reflective plane or light reflected at certain predetermined angles or ranges of angles while not detecting light reflected from the first side or at other predetermined angles or ranges of angles.

The wafer can include a pattern at the reflective plane, and determining the absorption of the wafer may include obtaining an image of the pattern and analyzing the image, such as by evaluating the degree of contrast in the pattern. The image of the observed pattern may be enhanced through use of a filter configured to block light reflected from the first side of the wafer.

A calibration wafer suitable for use in calibration of an optical sensor can include an absorbing layer configured to absorb at least a portion of light at a selected wavelength and a substrate. The substrate and the absorbing layer can be selected and configured such that a reflective plane that reflects at least a portion of light at the selected wavelength lies at a position distinct from the outer surface of the absorbing layer.

The absorbing layer may comprise silicon, for instance. The wafer may further include at least one additional layer between the absorbing layer and the substrate. The substrate may also comprise silicon, and the additional layer may comprise silicon dioxide. As noted above, the reflective plane and first or outer surface of the wafer may be inclined relative to one another. The first side of the wafer can include an anti-reflective coating, or may be textured. The reflective plane can comprise, for example, a layer, film, or coating of reflection-enhancing material, or may comprise a textured surface, a pattern, or a grating. Other suitable materials may be used in the wafer, such as, for example, Si, Ge, GaAs, InP, AlAs, GaN, InN, GaP, GaSb, InSb, SiC, diamond, AlGaAs, GaInAsP, InGaN, SiGe, or SiGeC.

A system for calibrating a temperature measurement device can include a chamber, such an RTP chamber, adapted to receive a semiconductor wafer. The wafer may comprise a calibration wafer, and the chamber can also include a heating device in communication with the chamber and configured to heat the wafer. The system may utilize a temperature measuring device configured to monitor the temperature of the wafer, and include a calibrating light source configured to emit energy comprising at least one selected wavelength towards the wafer. At least one light detector may be positioned to detect the amount of light energy being reflected from the wafer at the selected wavelength after the light energy has traversed a path, at least a portion of the path falling within at least part of the body of the wafer.

The system may also include a controller in communication with the light detector and the temperature measuring device that is configured to calibrate the temperature measurement device based on the detected light. The controller may comprise a computer system or systems, and may also control the other elements of the RTP chamber. The light detector may comprise a photo or other optical sensor. The temperature measuring device can comprise a pyrometer.

A method of calibrating a temperature measurement device can comprise determining, for a first selected temperature range, the absolute temperature of an object based upon measurement of the energy transmitted through the object from a calibration light source and determining, for a second selected temperature range, the absolute temperature of the object based upon light reflected from the object after light has traversed a path comprising at least one reflection inside the object. At least one temperature measurement device may be calibrated to account for variation from the absolute temperature in the first and second selected temperature ranges.

The object may comprise a calibration wafer, and the measurement device may comprise a pyrometer.

The calibration process may be configured so that the upper limit for the first selected temperature range and the lower limit for the second temperature range are approximately equal, and are defined by a fall-off in the transmitted light signal. The upper limit for the first selected temperature range and the lower limit for the second temperature range can both equal about 850° C. Alternatively, the first and second temperature ranges may at least partially overlap.

A method for determining the temperature of an object can include directing coherent energy towards an object such that the object interacts with the coherent energy. The interaction may include, for example, transmitting or reflecting at least a portion of the energy. The method can further include directing incoherent energy towards the object such that the object interacts with the incoherent energy. An absolute temperature of the object may be determined based upon measuring the incoherent energy after interaction with the object. A first measurement of the coherent energy after interaction with the object may be performed, followed by a second measurement of the coherent energy after interaction with the object, with the second measurement being performed after the temperature of the object has been changed. Based on the first and second measurements of coherent energy, the change in an optical path length within the object may be determined, and the temperature change may then be determined based on the change in the optical path length.

Determining the absolute temperature of the object may include determining the degree of absorption in the object based on measurement of incoherent energy reflected from the object and/or measurement of incoherent energy transmitted through the object.

At least one of the coherent energy and the incoherent energy may be varied in time, for example, by modulation.

The method may also include measuring the temperature of the object using a temperature measurement device and calibrating the temperature measurement device based on the determined absolute temperature and temperature change. The object may comprise a semiconductor process wafer or a calibration wafer, and the temperature measurement device may comprise a pyrometer.

A method of determining the temperature of a semiconductor wafer can include providing an imaging system and using the imaging system to obtain an image of a pattern that lies in or on a surface of the semiconductor wafer. The absolute temperature of the wafer may be determined based on the degree of contrast in the image. The pattern may be viewed through a portion of the wafer containing a material with optical properties that vary with temperature, with the portion lying between the imaging system and the pattern.

The method may further include directing light energy towards the semiconductor wafer, and the image of the pattern can be obtained by detecting light from the source that has been reflected by the pattern and/or transmitted through the wafer. Alternatively, the image of the pattern may be based on light emitted from the object. The determined temperature may be used to calibrate one or more measurement devices, such as a pyrometer.

BRIEF DESCRIPTION OF THE DRAWINGS

A full and enabling disclosure including the best mode of practicing the appended claims, directed to one of ordinary skill in the art, is set forth more particularly in the remainder of the specification, which makes reference to the appended figures, where like reference numerals are intended to represent analogous features, and in which:

FIG. 19 shows exemplary calibration wafer structural arrangements;

DETAILED DESCRIPTION

Figure 1:
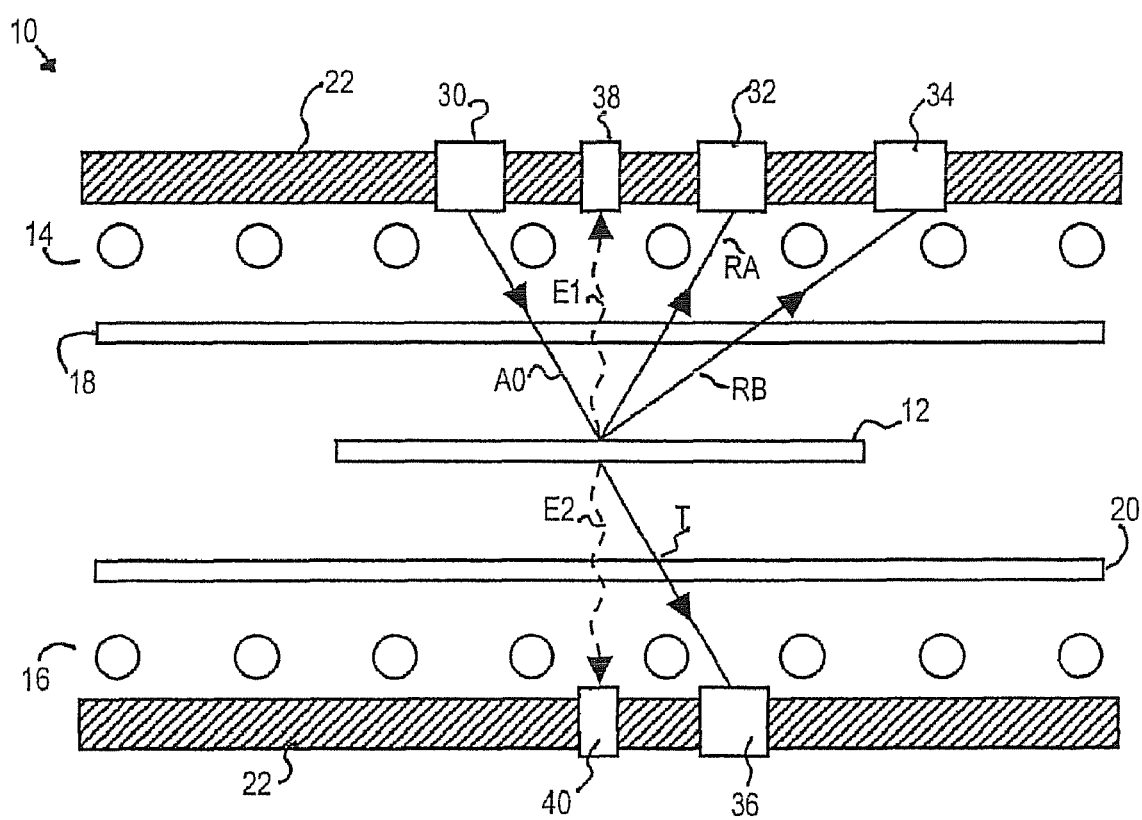
FIG. 1 illustrates an exemplary RTP chamber.

Reference will now be made in detail to various embodiments of the present subject matter, one or more examples of which are illustrated in the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the disclosure herein includes modifications and variations as come within the scope of the appended claims and their equivalents.

U.S. patent application Ser. No. 10/178,950 by Paul J. Timans, filed Jun. 24, 2002 and assigned to the present assignee, is hereby incorporated by reference for all purposes herein. U.S. patent application Ser. No. 10/178,950 describes various approaches for deducing the temperature of a wafer including performing measurements of light transmission through a wafer. Such measurements may find use in determining the temperature of wafers undergoing a wafer manufacturing process. One particular application includes determining the wafer temperature and then using that temperature reading to calibrate a pyrometer or other temperature sensor that is used to measure the wafer temperature. For calibration, a special wafer can be used whose structure and composition is known ahead of the calibration procedure, so that its optical properties and their temperature dependence are predictable. In this case, an in situ measurement of the optical properties can be used to deduce the wafer temperature. The optical absorption coefficient of the semiconductor substrate, $\alpha(\lambda, T)$, often exhibits a strong temperature dependence, hence measurement of $\alpha(\lambda,T)$ can lead to an accurate determination of the wafer temperature.

The optical transmittance, $S^*$, depends on $\alpha(\lambda,T)$, and as a result, measurements of $S^*$ can be used to determine the wafer temperature. Also, the reflectance, $R^*$, is also affected by $\alpha(\lambda,T)$, and hence it can also be used to monitor temperature.

A special problem of using transmission measurements to deduce the wafer temperature may arise for temperatures above ~900° C. Difficulty may arise for silicon wafers of typical thickness (e.g. 725 μm for 200 mm diameter wafers or 775 μm for 300 mm diameter wafers), because at high temperatures the optical absorption coefficient of silicon is quite high, and hence the amount of light transmitted by the wafer can become too small to measure accurately. Solutions for the problem may include using thin wafers, or wafers that include thin regions. The thin wafers or wafer regions are also made of silicon, but their thickness, d, is much smaller than that of the standard wafers (e.g. d<150 μm) so that there is a reasonable degree of light transmission at high temperature (e.g. $>10^{-7}$) and accurate measurements can be performed, even at temperatures as high as 1100° C. One possible difficulty with this approach is that such thin sections or regions may be mechanically fragile, and hence making such wafers may be difficult and expensive. Another potential problem with the approach arises because different regions of the wafer can be mechanically and optically different. Since the optical and thermal properties of the calibration wafer may not be uniform, the wafer may heat non-uniformly while being heated in the RTP tool, which could lead to more complex behavior during the calibration process, and could potentially make results less accurate. One alternative is to use a transparent substrate to support the thin silicon wafer, or to use a wafer of a transparent substrate with a silicon surface coating of the desired thickness. However, such structures are generally expensive and complex to make. Furthermore, they may not resemble a typical wafer and hence might be less useful for calibrating the pyrometer. Furthermore, the difference in thermal expansion coefficient between the silicon surface layer and the transparent substrate could cause stress in the substrate or in the film. Such stresses could cause damage and/or alter the optical properties of the silicon.

Because it can be difficult to use transmission measurements to determine the temperature of a silicon wafer at high temperature, embodiments of the present subject matter provide ways to perform analogous types of temperature measurement based on the reflection of light from a wafer. The approaches may be used in various ways to determine the temperature of wafer. In particular, the approach allows accurate determination of temperature for the high temperatures where transmission measurements are difficult.

Various embodiments disclosed herein generally utilize a measurement of reflected light to deduce the temperature of the wafer. The reflected light measurement can be performed within a semiconductor processing chamber, such as that shown in FIG. 1.

FIG. 1 illustrates an exemplary RTP process chamber 10 where the wafer 12 is heated by banks of lamps 14 and 16. In the example shown the banks of lamps are both above (14) and below (16) the wafer. The wafer is supported within a process environment that is isolated from the surroundings by windows both above (18) and below (20) the wafer 12.

One of skill in the art will recognize that chamber 10 is merely exemplary, and the embodiments disclosed herein are equally usable in other types of chambers and chambers including configurations other than what is shown in FIG. 1. For instance, although lamps are shown above and below the wafer, this is not necessarily the case in other chamber designs. Indeed, in other suitable chambers, the lamps may be replaced or supplemented by other heating sources, such as different lamp arrangements, a susceptor, hot plate, or other contact-based heating approach, conductive heating, convective heating, RF or microwave sources, scanning lasers, and particle beams.

It should also be understood, however, that besides wafers, chamber 10 may also be adapted to process optical parts, films, fibers, ribbons, and other substrates, and the use of the term "wafer" in the present disclosure is for example only, and is not meant to exclude any other particular shapes or substrates.

One of skill in the art will recognize that a variety of processes may be carried out in chambers such as the one illustrated in FIG. 1 and for which accurate temperature measurements may be desired. For instance, the chamber may be configured and used for heat treatment or annealing of a substrate, during oxidation of the substrate, diffusion treatment, or during other processes which modify, add films, or otherwise involve a reaction of the surface and/or other part(s) of the substrate. Other processes may include any suitable film deposition process, such as a chemical vapor deposition process or an atomic layer deposition process. Still further processes may include plasma processing, ion implantation, ion implantation damage annealing, silicide formation, reflow, depositing a material on a substrate, or etching a substrate.

The windows may be made of quartz glass, sapphire, AlON, or any other material that can transmit the energy from the lamps to the wafer. The lamps are contained within a chamber that has walls 22. The walls may reflect lamp radiation to improve the coupling of lamp energy to the wafer. Although energy is indicated as being projected through the same windows as used by the various sensors to monitor emitted, reflected, and transmitted energy, chambers may be configured so that energy is projected through windows separate from those through which the emitted, reflected, and transmitted energy is monitored. In fact, each such sensor could have a separate window, and any window could be configured to transmit or block certain ranges of energy in order to enhance measurement capabilities of the system.

The system also has various sensors and optical instruments that can be used to monitor the wafer during processing, as well as other equipment (not shown) to implement wafer processes, such as gas inlets/outlets, cooling systems, and the like.

FIG. 1 shows an exemplary configuration of instruments and sensors and an exemplary light source 30. Light source 30 is a source, or combination of sources, that can illuminate the wafer surface by emitting a ray A0 that is incident on the wafer. The reflected light ray RA corresponds to an essentially specular reflection from the surface of the wafer. The reflected energy in ray RA can be detected by a sensor 32. The reflected or scattered light ray RB corresponds to energy from ray A0 that is reflected in a non-specular direction. Such a ray can arise if the ray A0 encounters a surface in the wafer that is inclined relative to the surface that produces reflected ray RA. It can also arise from a scattering effect or a diffraction effect. The energy in ray RB can be detected by a sensor 34. Some of the energy from A0 may also pass through the wafer, forming a transmitted ray T. The energy in this ray can be detected by a sensor 36. Sensors can also monitor energy emitted by wafer 12 itself. For example, a hot wafer will emit thermal radiation. Sensor 38 can detect the radiation that is emitted from the top surface of the wafer, E1. Sensor 40 can detect the radiation that is emitted from the bottom surface of the wafer, E2. The angle of incidence of ray A0, and the angles at which the various sensors view the wafer surface can be selected as desired. Furthermore, the wavelength of the radiation emitted by source 30 can be selected as desired.

Source 30 may be a narrow band source, such as a laser, or a broadband source such as a lamp, an LED, a superluminescent LED, a super-continuum light source or a hot object. In some applications it may even be an RF source, a microwave source, or a THz radiation source, for example. In general it is a source of electromagnetic radiation, emitting radiation in the wavelength range between 100 nm and 1 m. The wavelength range emitted by source 30 can be selected or altered by the use of optical filters. When laser sources are used, the wavelength can be selected, for example, by choice of the type of laser, or by using a tunable laser, or a multi-wavelength laser and by manipulating the laser wavelength through the use of non-linear optical media such as frequency doublers and mixers. The state of polarization of the light emitted from source 30 can also be controlled. For laser sources, which often produce polarized light, this may involve controlling the orientation of the laser and/or manipulating the orientation of the beam to obtain a particular state of polarization with respect to incidence of the ray A0 on the wafer surface. For all sources 30, the polarization may also be controlled by the use of polarizing and/or retarding optical elements. The output of energy from source 30 may be continuous, pulsed or modulated so that it varies with time. The state of polarization, the angle of incidence and the wavelength may also be modulated if desired. Although the radiation from source 30 is shown passing through the window, it may also be guided into the process environment by other means, such as light pipes, waveguides or optical fibers. In some cases the radiation from source 30 might not be able to pass through the window material selected from transmission of lamp radiation. In this case a separate section of the window can be included, which is made of a material that allows passage of the energy from source 30.

Filtering and polarizing elements can also be included in the optics in front of the sensors 32, 34, 36, 38, and 40. Such filters can be used to determine the state of polarization and the wavelength range of the energy that is detected in the rays that are reflected, scattered, transmitted or emitted by the wafer.

RTP chamber 10 and its components may be linked to a controller or controllers (not shown) for accumulating and processing measurement results and controlling the light sources, heat sources, and other components used in carrying out treatment processes. For example, the light sensors and pyrometers may be linked to appropriate circuitry running algorithms to implement the various methods disclosed herein and perform various tasks such as, e.g., a computer system configured to calculate wafer absorption based on light measured using the various sensors as discussed below.

Figure 2:
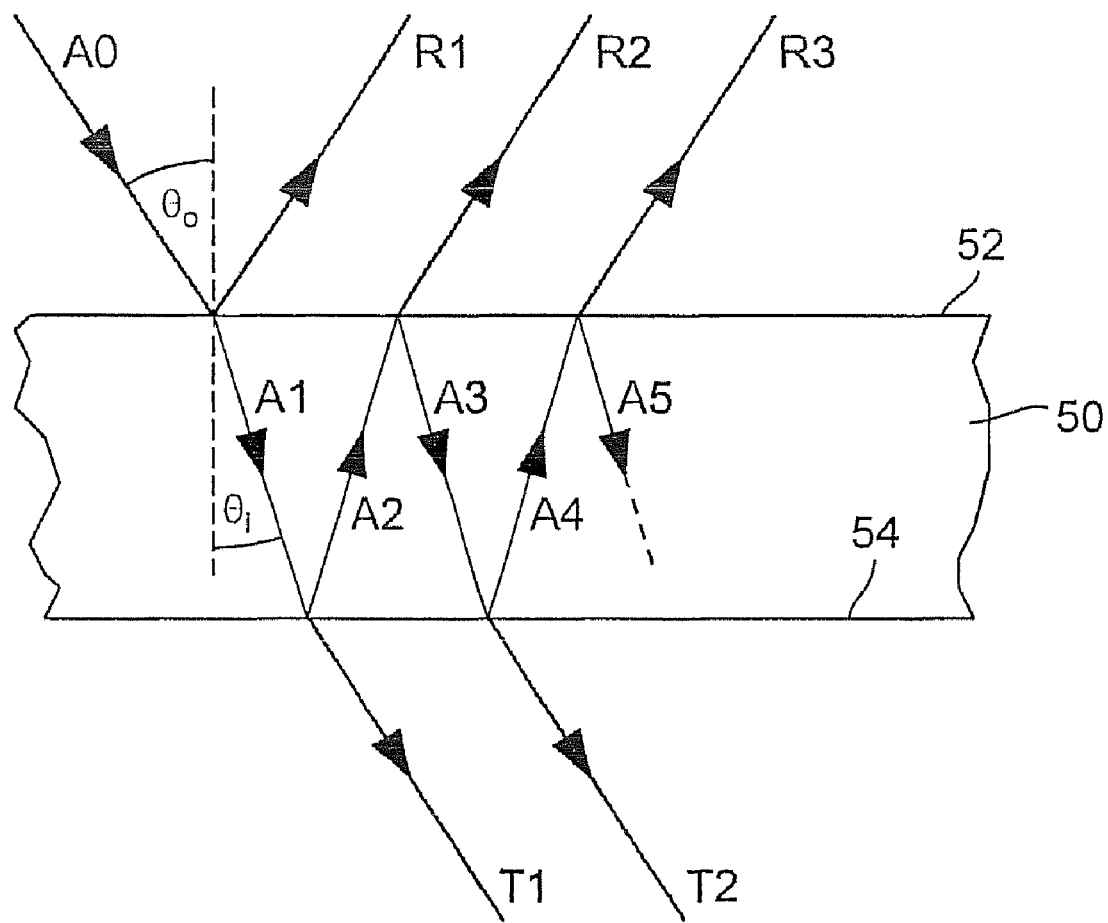
FIG. 2 shows an exemplary slab of material including a first and second side, and illustrates multiple reflections arising in the slab when a ray of energy A0 is incident on a surface of the slab.

FIG. 2 shows how multiple reflections can arise in a slab of material 50 when a ray of energy A0 is incident on at a first surface 52. The incident ray is partially reflected at the first surface 52, producing ray R1, but it is also partially transmitted producing an internal ray A1. Ray A1 is the reflected at a second surface of the slab 54, forming an internally reflected ray, A2. Some of the energy from ray A1 is transmitted through the second surface 54, forming a transmitted ray, T1. Some of the energy from ray A2 re-emerges from the first surface 52, forming a reflected ray R2, and so the process carries on. Because the intensity of reflected rays R2, R3, etc. are affected by absorption within the slab, measurements of reflected light intensity are sensitive to wafer temperature, and hence the approach described here can be used for temperature measurement. However, there are several significant challenges in making such measurements very accurate, and these are resolved by the approach described here. The concepts described herein can be used to assist in improving the accuracy of any measurement where reflected light measurements are used to deduce the strength of absorption within a slab of material.

The slab 50 with first surface 52 and second surface 54 may correspond to a wafer or layer within a wafer or other object having a front and back surface. Depending upon the configuration of a particular system, for example, the front or upper surface may comprise the first surface 52 and the back or lower surface may comprise the second surface 54, or vice versa. Therefore, the terms first and second surface are used to illustrate that the teachings contained in this document are equally applicable to objects in various orientations.

The skilled artisan will also recognize that the present disclosure uses various terms, including reflection, transmission, diffusion, and scattering. All such terms are meant to indicate interaction of energy, such as light energy, with an object or portion(s) of an object so that after such interaction(s), information about the object can be derived based on measuring the light (or other energy).

Figure 3:
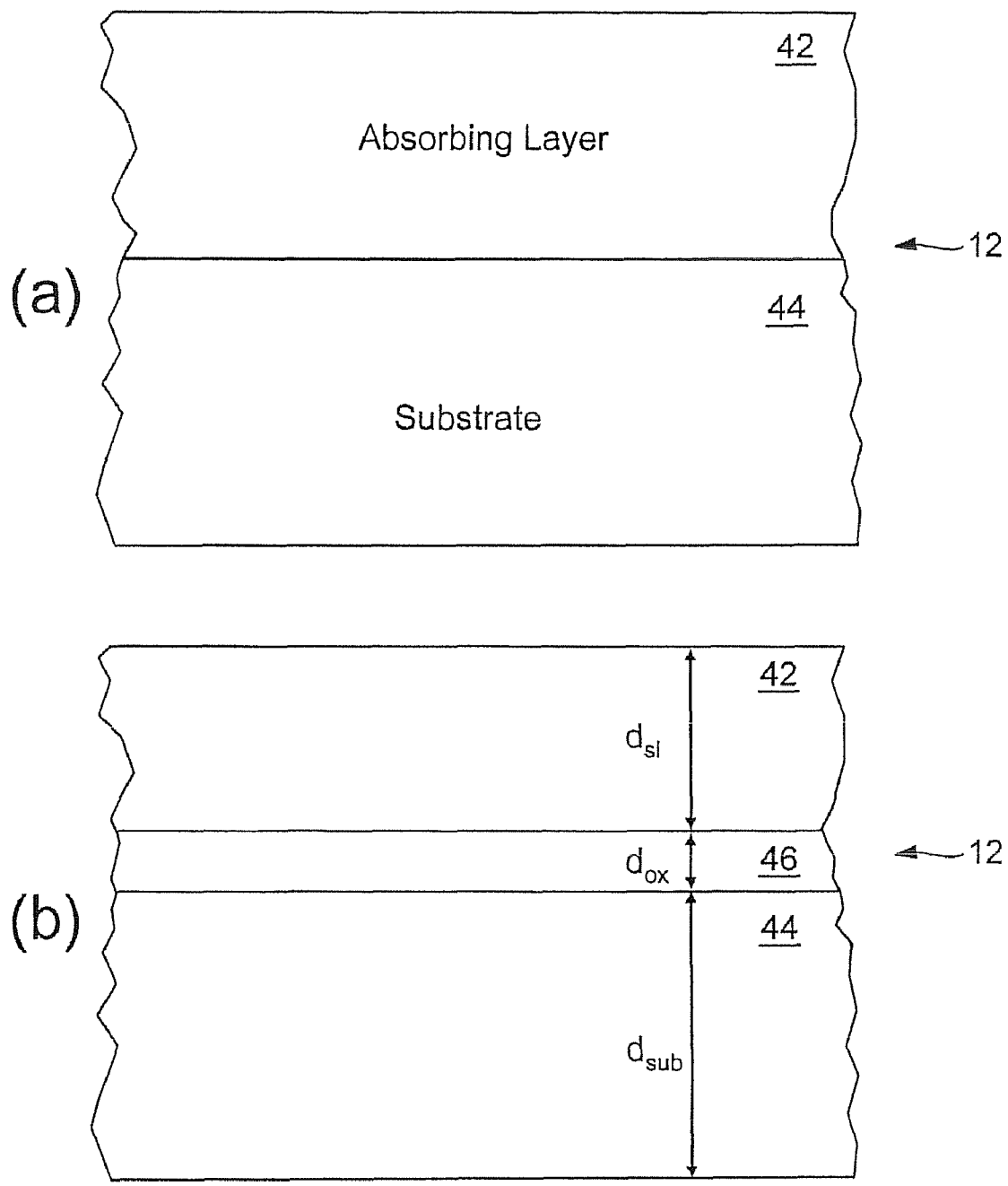
FIG. 3 depicts generic examples of arrangements of layers in calibration wafers.

FIG. 3(a) shows a generic example of a calibration wafer 12 that can be used for calibrations, such as the high-temperature calibration problem discussed above. There is a surface layer 42 (also referred to as "absorbing layer 42" or "absorbing slab 42" herein) that absorbs radiation, the surface layer 42 positioned on top of a substrate 44. The interface between the surface layer 42 and the substrate 44 is such that the surface layer reflects at least some light. To achieve such reflection, the optical properties of the substrate and the surface layer preferably are different. For example, the refractive indices of the surface layer and the substrate should be different at the wavelength that is being used for the measurement. However, if the substrate and the surface layer are the same, it is nonetheless possible to meet this requirement by adding a layer between the surface layer and the substrate. If the optical properties of this extra layer are different to those of the surface layer and the substrate then it will reflect light and the requirement is met.

One example of how to implement the latter concept is shown in FIG. 3(b), where the wafer includes an additional layer 46 between layers 42 and 44. In one embodiment, the wafer may comprise a silicon-on-insulator (SOI) wafer. The SOI wafer has a silicon substrate with two layers coating its surface. The middle layer 46 on top of the substrate 44 in this example is a layer of silicon dioxide. The top layer 42 is a layer of silicon. Such wafers are commercially available, from companies such as SOITEC of Bernin, France. Such a wafer can be fabricated by bonding two silicon wafers together, where at least one of the wafers has a layer of silicon dioxide formed on its surface. After bonding, the thickness of either the surface silicon and/or the substrate silicon can be decreased by any convenient means, such as polishing, etching or oxidation etc. Hence the thicknesses of the substrate, $d_{sub}$, the oxide, $d_{ox}$, or the surface layer of silicon, $d_{si}$, can be chosen as desired. The doping of these layers can also be set as desired. For example, the nature of the doping in the two wafers combined by the bonding process can be selected as desired.

By using the SOI structure, it is possible to form a relatively thin silicon layer on top of a standard silicon wafer. Then, one can exploit the effect of the temperature dependence of the absorption coefficient of silicon on the reflectance of such a structure to obtain accurate measurements of the temperature of the wafer. The skilled artisan will recognize that other approaches may utilize SOI structures to measure wafer temperature. However, generally, in those cases, the temperature dependence of the reflectance arose from the temperature dependence of the real part of the refractive index of silicon. As the refractive index varies with temperature, the optical thickness (refractive index×physical thickness) of silicon surface layer also changes. The optical thickness determines the nature of interference effects between light reflected at the surface and that reflected at the oxide/silicon interface. These interference effects result in oscillations between maxima and minima in the reflectance as the temperature varies in the silicon surface layer. Although this does provide an approach for temperature measurement, there are some difficulties with that method. In particular, in order to make an absolute measurement of wafer temperature, it is necessary to know both the refractive index of silicon and the SOI film thickness with extremely high accuracy. This generally renders the approach impractical for determining the absolute temperature with high accuracy. However, such methods can be used to make accurate measurements of temperature changes, and they can be combined with embodiments of the methods of the subject matter presently disclosed herein for further benefits.

Although later discussion herein will generally make exemplary use of SOI wafer structures, it should be recognized that there are many structures that could be used to create calibration wafers by the approaches described herein. For example, considering FIG. 3(a), the materials that are used in the absorbing slab 42 and in the substrate 44 can be chosen to best fit the application and the temperature range that needs to be calibrated. Likewise, the structure shown in FIG. 3(b) can be modified by changing the materials of any or all of the three layers 42, 44, and 46, or by replacing either or all of layers 42, 44, and 46 with multiple layers. Changes in the materials can include changes in the element or compounds used, changes in composition of alloys, changes in the phase or state of crystallinity and changes in doping or impurity concentrations. A few examples will be considered here, but there are very broad possibilities that will be apparent to one of skill in the art upon review of this disclosure.

One example may be the use of a structure such as that shown in FIG. 3(a), where the lower layer 44 is a heavily doped crystalline silicon substrate and the upper layer 42 is a layer of lightly doped silicon that is grown epitaxially on the substrate. In this case, the change in doping will result in an interface that reflects infra-red radiation. Such a structure could be attractive because there would be an excellent match in the thermal properties of the two layers and hence problems of thermal stresses during heating could be minimized. The doping in the substrate could be selected to be a rather slowly diffusing element, such as As, Sb or In, in order that the dopants do not diffuse excessively into the undoped layer during the high temperature calibration process.

A three-layer structure analogous to that shown in FIG. 3(b) could also be formed by ion implanting dopants at high energy to form a buried layer that serves to generate the reflecting interface. Such a structure could also be formed by ion-implanting dopants to form a high concentration doped layer and then growing silicon epitaxially above the layer. Another approach could include growing a heavily doped layer on a lightly doped substrate, and then growing a lightly doped layer above the heavily doped layer. In all these cases the doped layer would provide the difference in refractive index that generates reflected rays beneath the silicon surface layer. Another approach would be to grow a SiGe alloy layer on a silicon substrate and then to grow a silicon layer above the SiGe layer. As illustrated in FIG. 3(b), reference numeral 46 would then represent a SiGe film. Once again, the advantage here would be a closer match in the coefficient of thermal expansion. Structures could also be created using polycrystalline or amorphous silicon, although such materials have less well characterized optical properties than crystalline silicon has.

Such concepts also need not be confined to the use of silicon as the absorbing slab 42 or as the substrate 44. In order to use the reflection approach to cover other temperature ranges it may be appropriate to select other materials. For example, the absorbing slab 42 could contain any semiconductor material, including Si, Ge, GaAs, InP, AlAs, GaN, InN, GaP, GaSb, InSb, SiC, diamond etc. It could also be a semiconducting alloy such as AlGaAs, GaInAsP, InGaN, SiGe, SiGeC etc. The composition of such alloys could be optimized for particular applications. The absorbing layer 42 need not even be a semiconductor, provided it is a material whose optical properties vary with temperature. In particular its absorption coefficient at the measurement wavelength should vary with temperature. Likewise, the substrate 44 need not be silicon. It could be any of the materials mentioned above, or it could even be an insulator or a metal.

In any such instances, of course, the skilled artisan will recognize that the illustrated thicknesses such as $d_{ox}$ and $d_{si}$ would correspond to thicknesses of the actual materials used, with the appellations "ox" and "si" being used herein only for exemplary purposes.

The disclosure will now discuss various embodiments of the present subject matter as implemented using an exemplary SOI wafer. However, in light of the foregoing, it will be appreciated that the discussion of an SOI wafer is for purposes of example only, and use of other materials to implement the disclosed structures, systems, and methods is entirely within the scope of the present subject matter.

Figure 4:
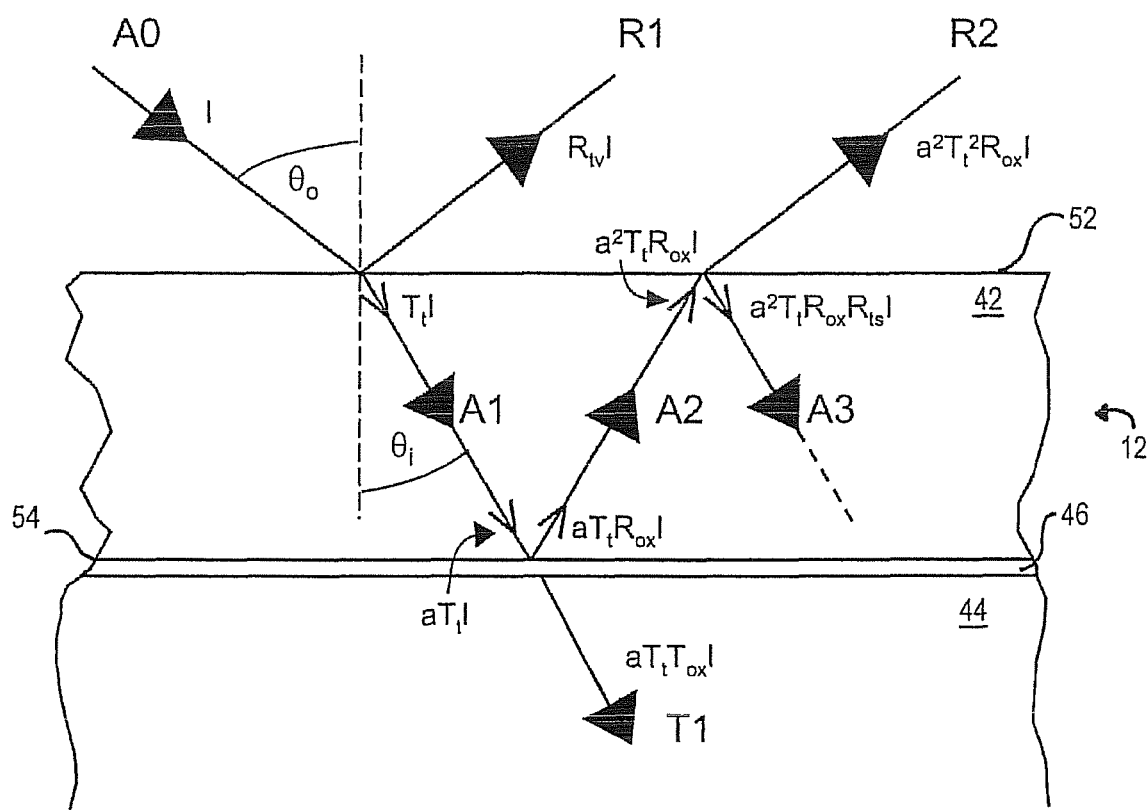
FIG. 4 illustrates multiple reflections arising in an exemplary calibration wafer.

FIG. 4 shows the paths of a ray of light, A0, incident on an exemplary SOI wafer 12 from an external light source. A fraction of the incident radiation is reflected at the top surface, which has a reflectivity $R_{tv}$ and transmissivity, $T_t$. Another fraction passes through the surface and forms ray A1, which reaches the interface between the oxide layer 46 and the silicon film 42 and substrate 44. In this figure, the oxide layer is represented as a single plane that reflects some of the radiation incident on it. In reality there will be components of light reflected at both interfaces of the oxide layer. For the current discussion such effects will be included in the analysis by considering their impact on the reflectivity of the lower surface of the silicon film, $R_{ox}$. In general, radiation will also pass through the oxide film and be reflected and transmitted at the back surface of the wafer, however for the present discussion it will be assumed that the substrate is effectively opaque. Radiation reflected at the oxide layer can return to the wafer surface 52 and exit, forming a second reflected ray, R2. The reflectivity of the surface for ray A2 is $R_{ts}$. Since in general ray A0 can be incident on the wafer at any angle of incidence, $\theta_0$, and in any state of polarization, the full analysis of the propagation of the rays requires all the reflectivities and transmissivities to take account of the appropriate angle of incidence and polarization. This can be done by performing separate analyses for rays incident with p- or s-polarization. Once properties for each of these cases have been obtained, the corresponding result for any other state of polarization can be obtained by combining the results for p- and s- in an appropriate manner.

From FIG. 4 it will be appreciated that the intensity of the reflected ray R1 is only affected by the reflectivity of the front surface of the wafer (WF), $R_{tv}$, so that if the incident ray, A0, has intensity I, then ray R1 has intensity $R_{tv}I$. The ray that has been transmitted into the substrate has intensity $T_t I$ just at the point where it has passed through the front surface region into the bulk of the wafer. As the ray A1 traverses the substrate it loses intensity because of absorption of energy. As a result it has an intensity $aT_t I$ just at the point where it reaches the oxide layer. The quantity a is the internal transmittance of the silicon surface film, and is given by $$a = \exp(-\alpha(\lambda,T)d_{si}/\cos\theta_i)$$ (Eq. 1)

where $\theta_i$ is the internal angle of propagation. The latter angle is the angle between the direction of the ray and the normal to the wafer surface. The portion of radiation that is reflected at the oxide layer to form ray A2 has intensity $aT_t R_{ox} I$ just at the point where it is reflected. When the reflected ray A2 reaches the front surface it has lost more intensity as a result of absorption in the substrate and now has intensity $a^2 T_t R_{ox} I$. The portion of ray A2 that is reflected at the front surface to form ray A3 initially has intensity $a^2 T_t R_{bs} R_{ts} I$, whereas the portion that is transmitted back out through the front surface forms ray R2, having an intensity $a^2 T_t^2 R_{bs} I$. The further propagation of ray A3 will generate more rays reflected and transmitted at the oxide layer, and the analysis of the propagation of such rays follows in a similar manner. Summarizing the total energy reflected at the front surface of the wafer can be estimated from its reflectance $R_{WF}^*$, given by $$R_{WF}^* = R_{tv} + \frac{a^2 T_t^2 R_{ox}}{1 - a^2 R_{ts} R_{ox}}.$$ (Eq. 2)

This equation is adapted from the standard equation for light reflected from a slab of material, which is given by $$R_{WF}^* = R_{tv} + \frac{a^2 T_t^2 R_{bs}}{1 - a^2 R_{ts} R_{bs}},$$ (Eq. 3)

where the symbols have the same meanings as before, except that $R_{bs}$ is the reflectivity of the back surface of the slab for radiation incident on it from within the slab. In deducing equation 2, $R_{bs}$ is replaced with $R_{ox}$. Hence it will be recognized that the principles described here for improving measurement through the use of calibration wafer based on an SOI structure will generally apply to any approach where the effects of absorption within a slab of material are exploited in order to perform a measurement.

One of skill in the art will also note that expressions 2 and 3 were obtained with the assumption that the intensities of the individual rays R1, R2, R3 etc. may be added together. This is a fair assumption provided that the reflectance is being estimated for light that can be treated as being incoherent. Light preferably can be treated as being incoherent if the wavelength range of the light that is measured, Δλ, is large enough compared to thickness of the silicon film. One criterion is that $$\Delta\lambda \gg \frac{\lambda^2}{4n_{si}d_{si}}, \quad \text{(Eq. 4)}$$

where $n_{si}$ is the refractive index of the silicon film. For a silicon film that is 50 μm thick, considering the wavelength of 1.55 μm and assuming that $n_{si}$ is ~3.6, Eq. 4 indicates that Δλ needs to be much greater than 3 nm in order for the light to be treated as being incoherent. For a thicker film, the requirement is less stringent. For example, for the same conditions but with a layer of silicon that is as thick as a standard for 300 mm diameter wafer, 775 μm, then Δλ needs to be much greater than 0.2 nm. If the wavelength range of the light that is collected at the detector is relatively small, then the light source needs to be treated as being coherent. This means that the reflectance cannot be obtained by summing intensities of reflected beams, and instead, the amplitudes of the electric and magnetic fields associated with each ray need to be summed in a vector fashion. Once this summation is performed, the intensity of the reflected light can be obtained from the Poynting vector as is customary in electromagnetic wave propagation analysis. For coherent light, the propagation of the rays within the substrate needs to be considered with regard to both the amplitude and the phase of the electromagnetic wave. The analysis can be performed using the standard methods of thin film optics.

When an approach based on the reflection of light is used to deduce absorption, the sensitivity of the method to absorption can be strongly affected by the relative magnitudes of the rays marked as R1 and R2 in FIGS. 2 and 4. Typical measurements of reflected light, such as reflectance measurements, collect energy from both these rays, and indeed may also collect energy from higher order reflections such as R3 shown in FIG. 2, etc. One problem that can arise is when the intensity of the first reflected ray (R1), RtvI, is much greater than that of the other rays. In this case, the influence of the absorption within the slab on the detected light signal is reduced, relative to a case where the contribution of first reflected ray to the detected light signal is smaller that that from the other reflected rays, such as R2. The problem is illustrated through the results shown in FIG. 5.

Figure 5A:
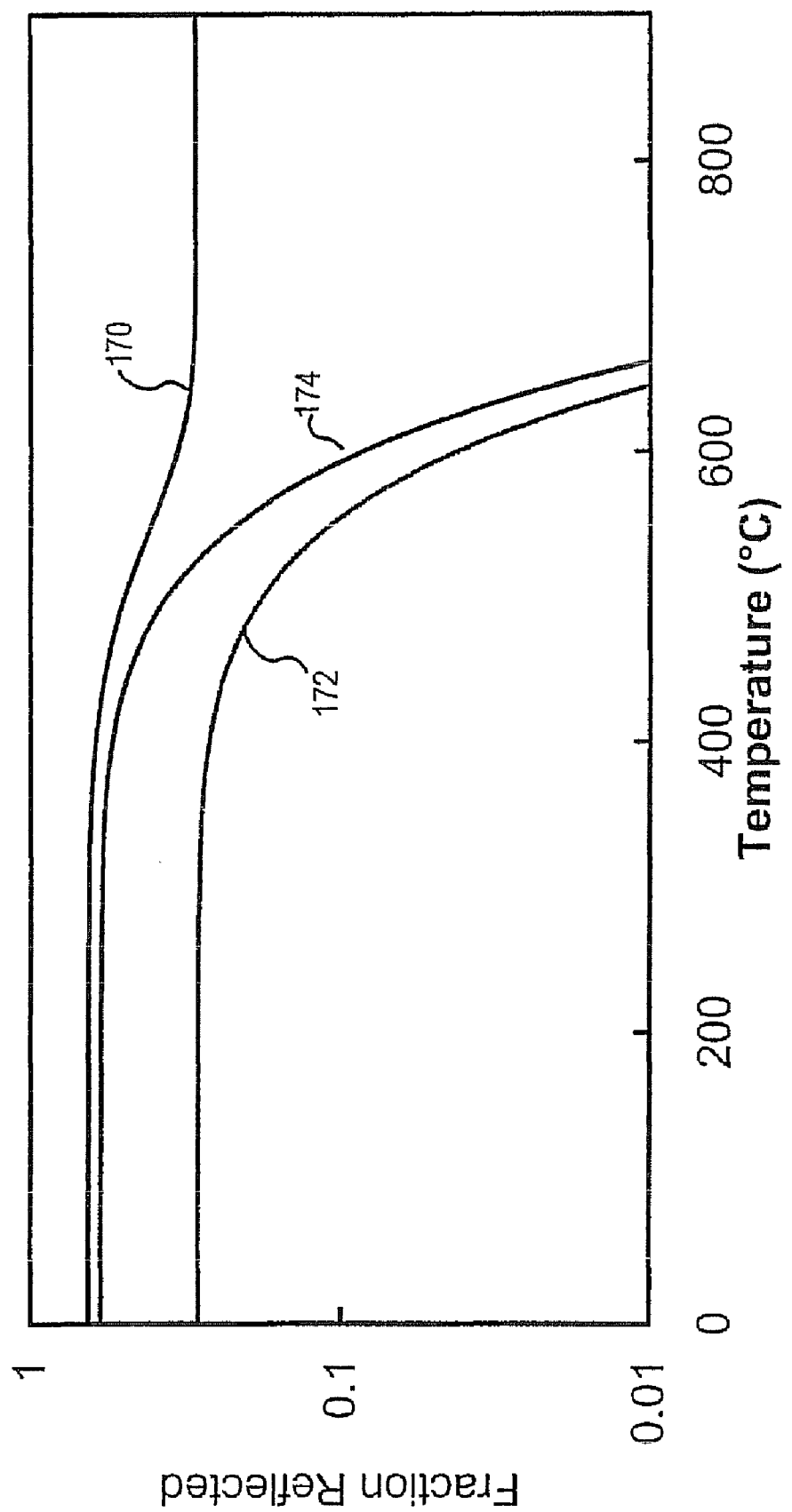
FIG. 5 includes plots of reflectance measurements and simulated reflectance measurements.

FIG. 5(a) shows a theoretical prediction of the temperature dependence of the reflectance of a slab of lightly doped silicon that is 775 μm thick at a wavelength of 1.55 μm. Because the absorption coefficient of silicon varies with temperature, the internal transmittance also changes with temperature. This affects the intensity of radiation that emanates from the wafer surface in rays such as R2 and R3 in FIG. 2. The calculation was performed for radiation incident on the wafer at normal incidence, and it was assumed that the back surface of the slab has a coating that made the reflectivity, $R_{bs}$=0.6. The reflectance of the front surface was calculated for a front surface reflectivity, $R_{fv}$=$R_{ts}$=0.3 (plotted at 170 in the graph) or 0.0 (plotted at 174 in the graph). The fraction of light in the R2 reflection was also calculated, for the case where the front surface reflectivity was 0.3 (plotted at 172 in the graph). α(λ,T) for the wavelength of 1.55 μm was obtained from the model given by Vandenabeele and Maex in J. Appl. Phys. 72, 5867 (1992). The reflectance axis in FIGS. 5 (a) and (b) is shown with a logarithmic scale, in order to emphasize the differences in the behavior for the cases considered here.

At relatively low temperatures, <400° C., there is very little absorption in silicon at the wavelength of 1.55 μm, and as a result, the reflected light does not vary much with temperature. However as the temperature rises above 500° C. the internal transmittance decreases and the intensity of reflected light components such as R2 decreases, until at temperatures >800° C., the wafer is effectively opaque and R2 etc. do not contribute to the reflectance. This trend explains the transition in the reflectance (for the case shown at 170, where $R_{fv}$=$R_{ts}$=0.3) from ~0.62 at ~400° C. down to ~0.3 at ~670° C. However, it will be apparent that if the front surface reflectivity is reduced from 0.3 to 0.0, a far more abrupt change in reflectance occurs, as it drops from ~0.55 at ~400° C. down to <0.01 at ~670° C. (as shown at 174). This is because if the front surface reflectivity is zero, then the only reflected light arises from the back surface reflection, and as the temperature rises the latter tends towards zero. The same trend is seen in the curve for the component of the reflectance that arises from the ray R2 (for the case where $R_{fv}$=$R_{ts}$=0.3, shown at 172) which drops from ~0.27 at ~400° C. down to <0.01 at ~650° C.

Figure 5B:
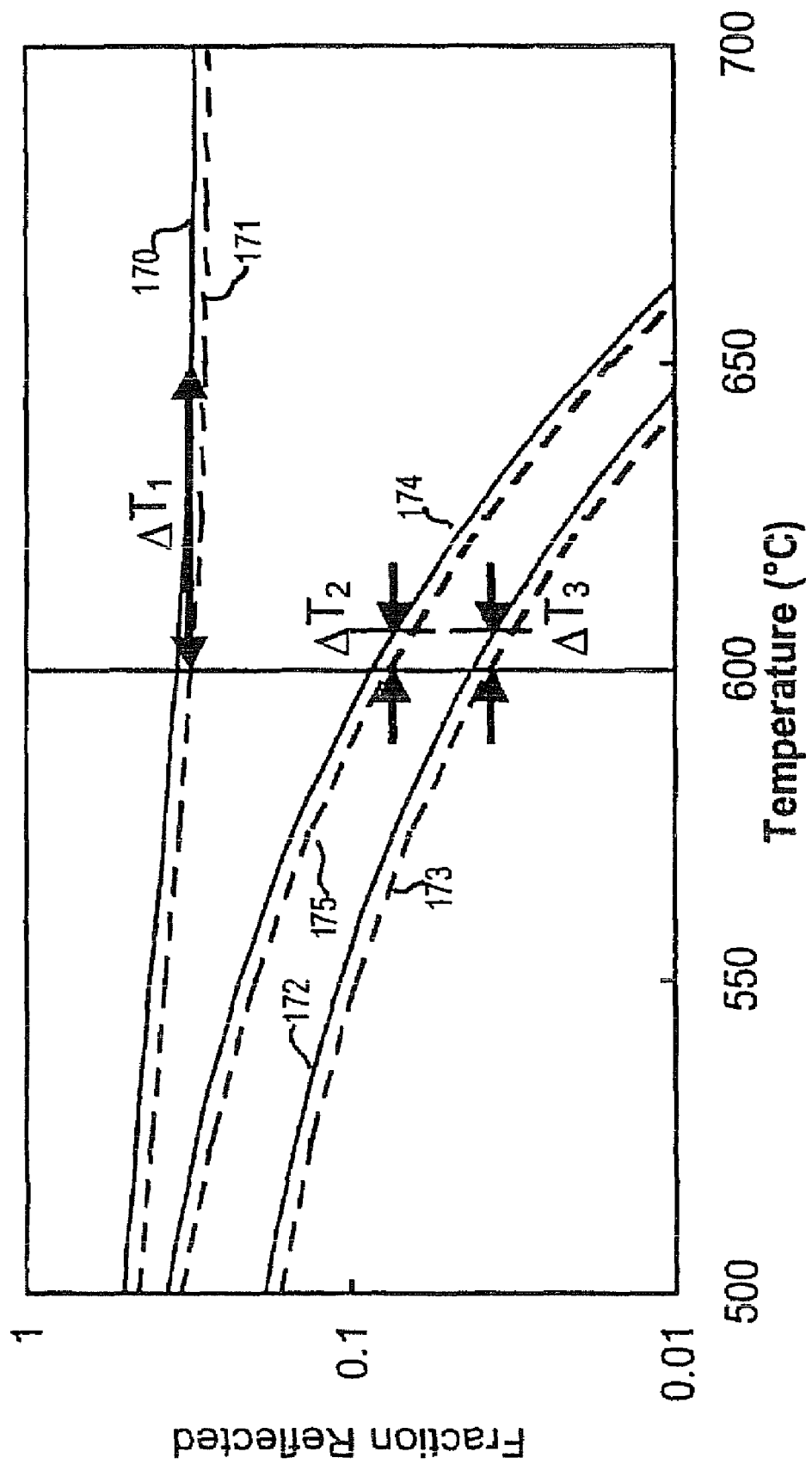

The effect of the differences in sensitivity to temperature change on errors in temperature measurement can be seen in the results shown in FIG. 5(b). This figure includes three extra curves (171, 173, and 175) that represent examples that simulate measured temperature dependences for the quantities shown in FIG. 5(a). Each curve actually was calculated from 90% of the values of the three curves shown in FIG. 5(a); the difference of 10% was introduced to simulate the effect of a measurement error. It is then possible to deduce a "measured" temperature for any given reflectance measurement by comparison with the corresponding theoretical curve. Examples are shown for a temperature of 600° C. Here it can be seen that if the reflectance for a wafer with the front surface reflectivity of 0.3 is measured, a 10% error in reflectance leads to a very large temperature error, $\Delta T_1$, of ~50° C., as indicated by curves 170 and 171. In contrast, measuring the reflectance for a wafer with the front surface reflectivity of 0.0, a 10% error only leads to a temperature error, $\Delta T_2$, of ~6° C., indicated by the curves 174 and 175. Likewise, in measurement of the reflected light component R2 for a wafer with the front surface reflectivity of 0.3, a 10% error only leads to a temperature error, $\Delta T_3$, of ~6° C., as shown by curves 172 and 173. These trends suggest that accurate temperatures can be obtained, provided that the amount of energy that 1R contributes to the reflectance is reduced, and/or if a component such as R2 is selectively measured.

Embodiments discussed herein will aid in ensuring that the detected light signal is strongly affected by the absorption within the slab of material. It will be shown that by making the contribution of the first reflected ray relatively small, it is possible to obtain a better measurement of the absorption within the slab of material, and that this approach can lead to more accurate temperature measurement.

As noted above, the problem of the effect of front surface reflection has been discussed previously in literature. For example, Cullen et al. (IEEE Trans. Semiconductor Manufacturing 8, 346 (1995)) discussed the suppression of the front surface reflection through the use of a Brewster angle incidence on silicon wafers. Cullen also contemplated the possibility of applying an anti-reflection coating in order to suppress the front surface reflection. The application was to study the temperatures of metallized wafers, where a transmission based temperature measurement was hindered by the high degree of opacity of the front surface metallization. However, such approaches were limited in temperature range by the thick wafer. They can also be relatively difficult to use if the back surface of the wafer is rough, since this leads to light scattering, which can affect both the absorption within the wafer and the effectiveness of the Brewster angle incidence approach for suppressing the reflection.

Figure 6:
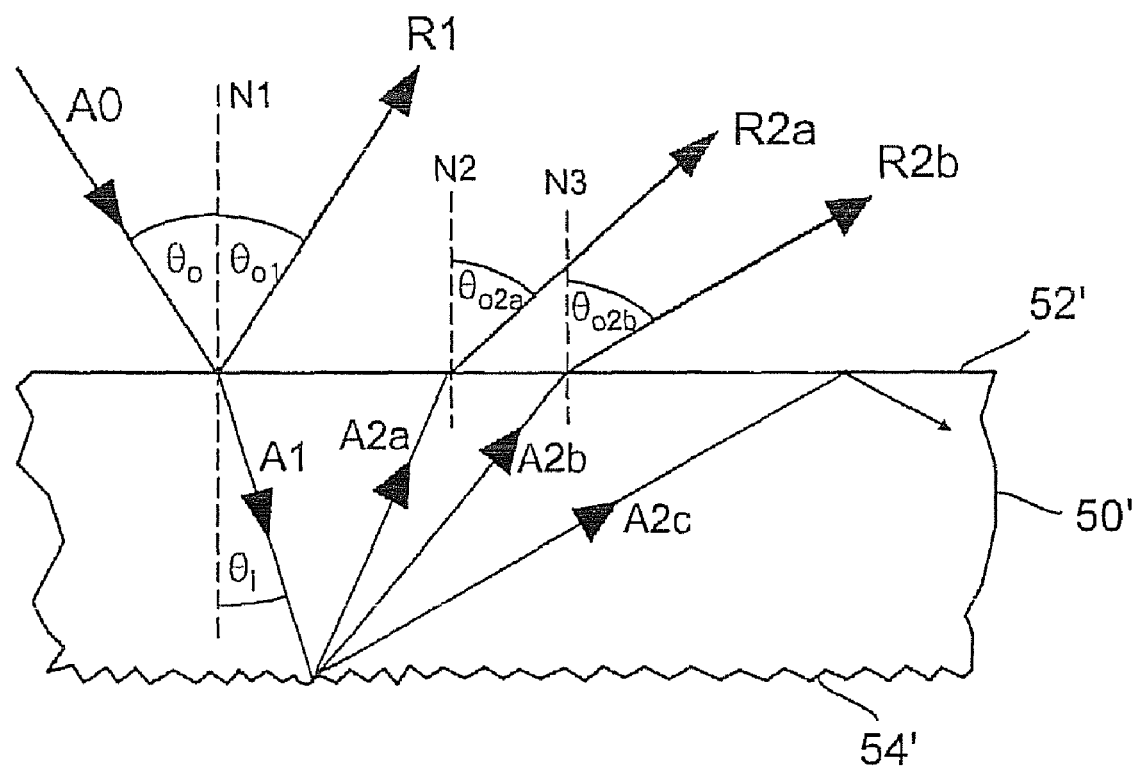
FIG. 6 illustrates an exemplary slab of material including a textured surface that may produce diffuse reflections.

Another approach that has been studied previously was diffuse reflection spectroscopy (DRS). The principle of DRS is illustrated in FIG. 6. Generally, DRS can only be applied to wafers with a rough back surface. It relies on setting up a light detection system that does not collect light reflected specularly at the smooth surface 52' of the wafer 50', but can collect light that passes through the front surface 52' of the wafer and undergoes a diffuse reflection from the rough back surface 54' of the wafer. Some of the light that is scattered diffusely from the back surface can exit back through the front surface of the wafer and then be collected by the light detection system. FIG. 6 shows how the internal ray A1 is scattered at the rough back surface of the wafer, generating rays such as A2a, A2b, and A2c. These rays can leave the surface to form diffusely reflected rays such as R2a and R2b. Some of the scattered rays, such as ray A2c, may be scattered through an angle that is so large that when they reach the front of the slab, SF, their angle of incidence exceeds that required for total internal reflection, and they cannot leave the wafer. A detector can collect light such as that represented by rays R2a or R2b. These rays leave the wafer surface at angles $\theta_{o2a}$ and $\theta_{o2b}$, which differ from that for the specularly reflected rays such as R1, which is reflected at the angle $\theta_{o1}$, which equals the angle of incidence, $\theta_o$. By measuring the scattered light signal as a function of the wavelength of the incident radiation, it is possible to collect a diffuse reflection spectrum. The intensity of light that reaches the back surface and then is re-reflected and exits the front surface is strongly affected by absorption of light within the substrate. Hence DRS is sensitive to absorption within the wafer. A diffuse reflection spectrum collected by this approach can provide valuable information about the relative strength of optical absorption at different wavelengths, and hence it can be used to determine wafer temperature. DRS has been implemented in temperature measurement products that are commercially available, e.g. the BandiT temperature monitor available from k-Space Associates, Inc., Ann Arbor, Mich., USA.

Despite this, DRS does not address the main problem described in the context of the present subject matter, because the thickness of the wafer is generally too large for DRS to work for high temperature measurements. Furthermore, there are some complications in using DRS, because the light scattering at the back surface is a complex effect that depends on the nature of the surface texture there. This means that different types of back surface texture will lead to different signals, and the magnitude and angular distribution of the scattered radiation is difficult to predict. Interpretation of such signals can be quite difficult and hence in some cases it may be difficult to use the approach to achieve an accurate measurement of the absorption in the substrate.

However, in accordance with embodiments of the present subject matter disclosed herein, a number of approaches can be used to improve the accuracy for sensing absorption within a slab of material by means of measuring the reflection of light from the slab while avoiding the difficulties that may be involved with approaches such as diffuse reflection spectroscopy. The approaches will be illustrated by figures using the exemplary SOI structure discussed earlier, but as also noted earlier, they are also applicable to any type of slab of material. For simplicity, the full SOI structure is not shown in all the figures, but the absorbing slab 42 is identified through the labels for its first surface 52, which the incident light first impinges on, and second surface 54, which lies at the other side of the absorbing slab 42. As noted above, in some embodiments, the first surface is the front surface of the slab and the second surface is the back surface of the slab, but the arrangement may be reversed depending upon particular implementations. In some presently-disclosed embodiments, the slab can include other features, such as surface coatings and textures as discussed further below.

Figure 7:
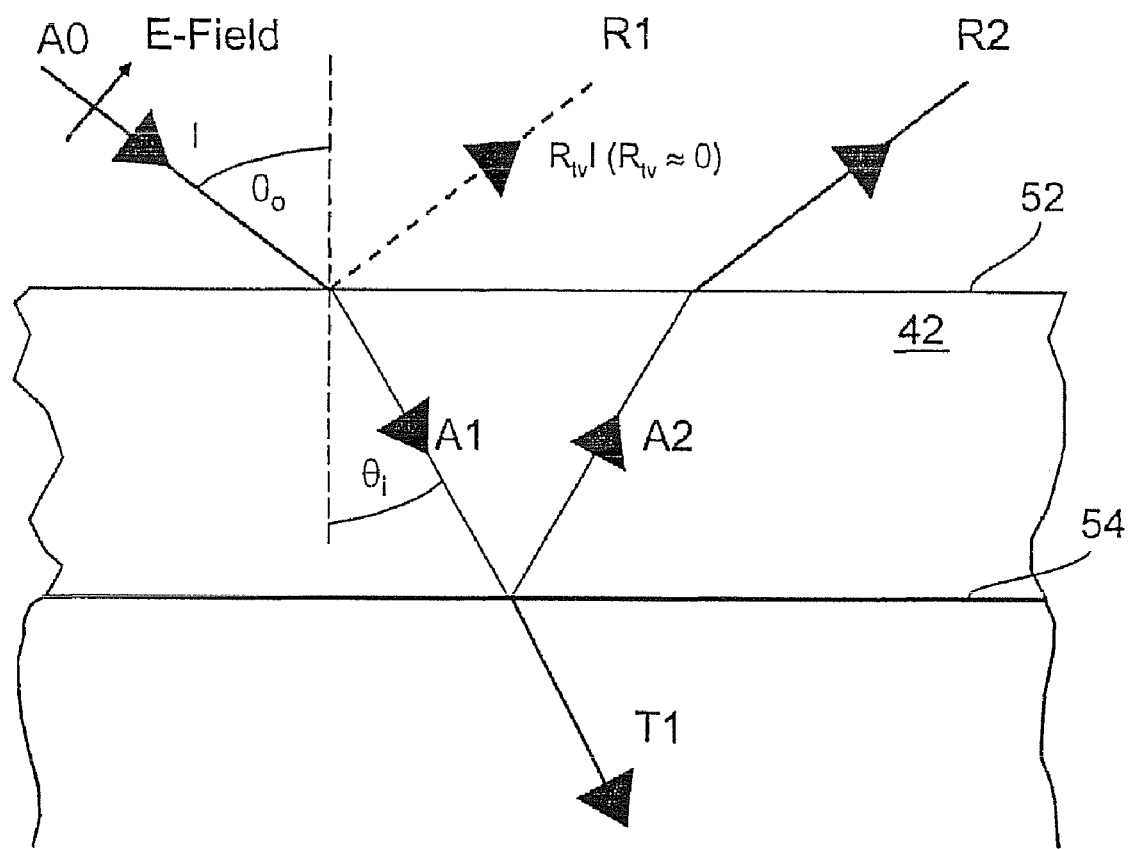
FIG. 7 illustrates an exemplary slab of material and associated reflections.

FIG. 7 shows an exemplary configuration where the reflectivity of the first surface 52 is reduced by selecting an angle of incidence and plane-of-polarization for the incident radiation that minimizes the reflectivity of the front surface ($R_{fv}$) at the wavelength of interest. For example, the incident energy can be p-polarized, and the angle of incidence can be near the Brewster angle for the material of the surface. For a wavelength of 1.55 μm and a silicon surface, a suitable angle would be ~75°. Since the front surface reflectivity is reduced by this approach, the relative contribution of rays such as R2 is increased, and hence the reflected light signal is more sensitive to absorption within the slab 50. Such an approach also has the added benefit that the front surface transmissivity, $T_f$ is increased, and hence the magnitude of the intensity of P2 rises further. The skilled artisan will note that the same approach can be implemented by placing a polarizer in the reflected beam of light, rather than polarizing the incident light. In this case, the polarizer would be arranged so that the light detector only received radiation that corresponded to the p-polarization. The latter approach may have some advantages in some cases, for example it allows the amount of stray radiation that reaches the detector to be reduced. Stray radiation could arise from the energy that is thermally emitted by the wafer or from radiation from the heating lamps. The approach could also be combined with the case where the incident radiation was p-polarized.

Figure 8:
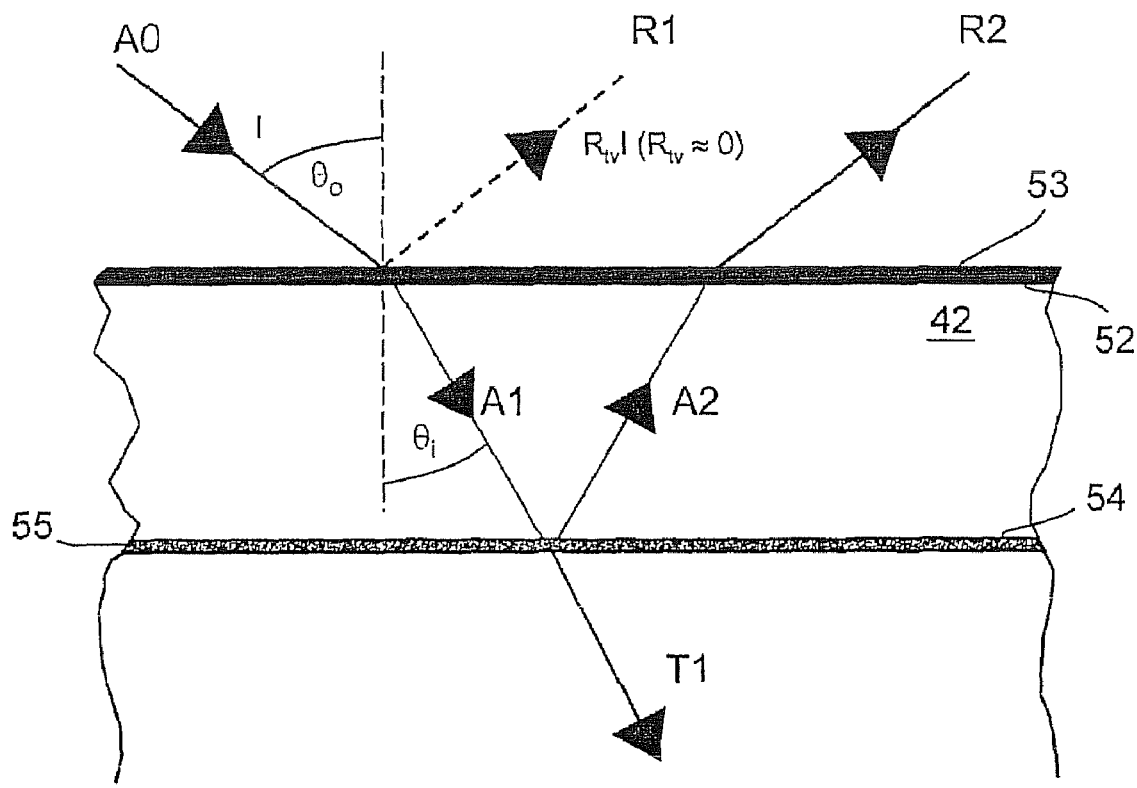
FIG. 8 illustrates an exemplary slab of material including at least one coating or film and associated reflections.

FIG. 8 shows a configuration where the reflectivity of the front surface 52 is reduced by adding a coating 53 that reduces the reflectivity of the front surface. This anti-reflection (AR) coating reduces the front surface reflectivity, $R_{fv}$ and the relative contribution of rays such as R2 is increased, and hence the reflected light signal is more sensitive to absorption within the slab. Such an approach also has the added benefit that the front surface transmissivity, $T_f$ is increased, and hence the magnitude of the intensity of R2 rises further. The AR coating should usually be a film that is highly transparent at the wavelength of interest, λ. Convenient films can include silicon oxide, silicon nitride, aluminium oxide, titanium, tantalum, hafnium or zirconium oxides. A "quarter wave" AR coating can be formed on the surface of a material with refractive index $n_s$ by forming a layer of a material with a refractive index $n_{AR}=(n_0 n_s)^{0.5}$ that is $m\lambda/(4n_{AR})$ thick to produce a reflectivity of almost zero for radiation incident from within a medium with refractive index $n_0$. The quantity m is an odd-number integer. One example, for the case of an incident wavelength of 1.55 μm, would be to use a silicon nitride film that is 194 mm thick. Silicon nitride has a refractive index of 2, and a film of this thickness provides a reasonable approximation to a quarter-wave anti-reflection coating. A silicon nitride film that is ~180 nm thick is effective over a reasonably broad wavelength range, e.g. for wavelengths between ~1.1 and 2 μm. This is merely one example of an AR coating design, and more complex stacks of thin films can be used to similar effect. Indeed the performance of such coatings can be optimized with respect to a range of wavelengths, angles of incidence and planes of polarization for the incident radiation. Such designs can be created with the aid of conventional thin-film coating design approaches.

FIG. 8 also indicates an example of a configuration where the reflectivity of the back surface 54 of the slab is increased.

This approach is effective because it increases the amount of light reflected at the lower surface of the slab of material, and hence it boosts the intensity of the ray R2, relative to that of R1. The reflectivity can be increased by a number of approaches. For example a reflecting film 55 can be formed at the back of the slab as shown in FIG. 8. The reflecting film may be a material with a high reflectivity, such as a metal, a silicide or other electrical conductor. It may also be a material with a refractive index that has a large difference to the refractive index of the slab of material. The refractive index may larger or smaller than that of the slab. In the case of the SOI film discussed above, the refractive index of the oxide layer is ~1.46, whereas that for the silicon film is ~3.6, hence there is a large difference between the two. Other films could also be used, such as silicon nitride, silicon carbide, aluminium oxide, a silicon germanium alloy, etc. A stack of films could also be used to increase the back surface reflectivity. The design can be optimized with the aid of conventional thin-film coating design approaches. One simple example can be through optimization of the SOI structure itself. In this case, the thickness of the oxide layer can be selected to make the reflectivity as large as possible. A large difference in refractive index could also be obtained by having a gap between the silicon layer and silicon substrate beneath, because any gaseous material (or a vacuum) that fills this gap has a refractive index close to unity.

Figure 9:
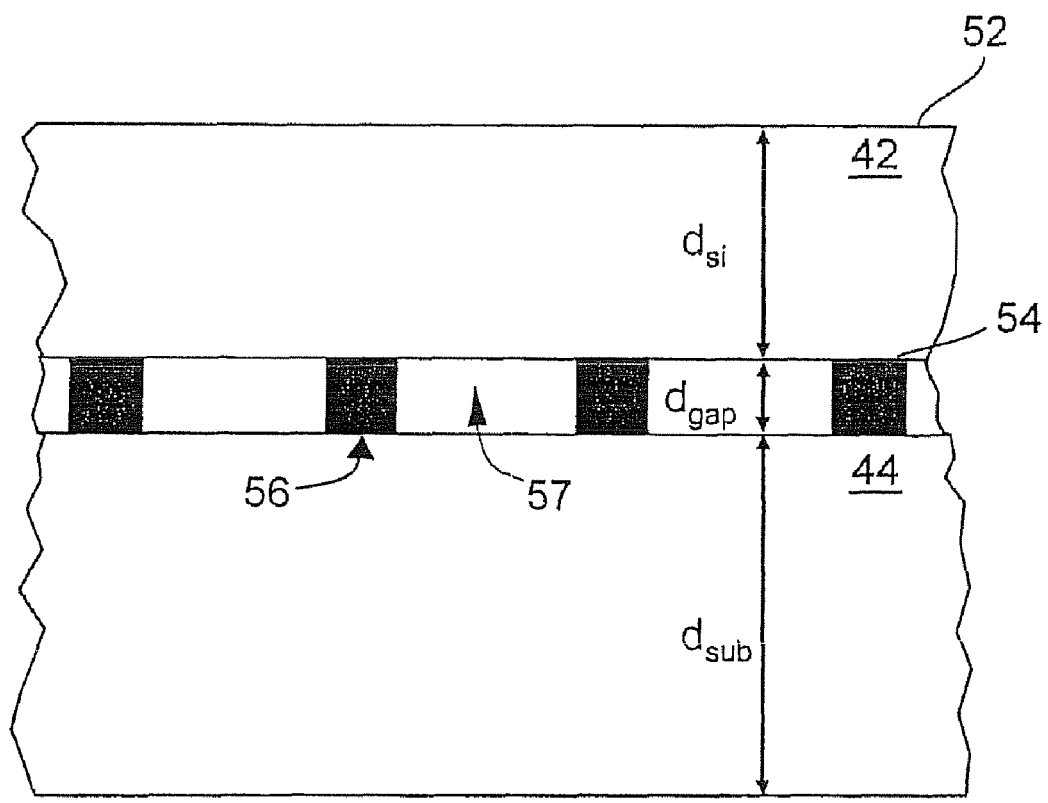
FIG. 9 illustrates an exemplary slab of material including a gap.

FIG. 9 shows a schematic diagram of such a configuration. In this example, the silicon surface layer 42 is held apart from the substrate beneath it by "support" regions 56 that determine the thickness $d_{gap}$ of the gap 57. Such structures can also function to keep the surface layer of silicon attached to the substrate. The support regions could be made of silicon or another material. One advantage of the structure shown in FIG. 9 is that the effects of different tendencies in thermal expansion in the layers can be minimized. In any structure that contains films of different materials, the differences in the coefficients of thermal expansion can lead to thermal stress as the object heats and cools. Such thermal stresses may deform the structure or alter its optical properties and are undesirable. By using the structure with the gap, as shown in FIG. 9, the effect of thermal expansion differences can be greatly minimized. The support regions may be formed as an array of pillars, and these pillars are free to move with the thermal expansion of the wafer. Hence thermal stresses are minimized. The pillars could even be made of silicon, in which case all the materials in the structure can expand together in unison and thermal stress can be completely eliminated.

Figure 10:
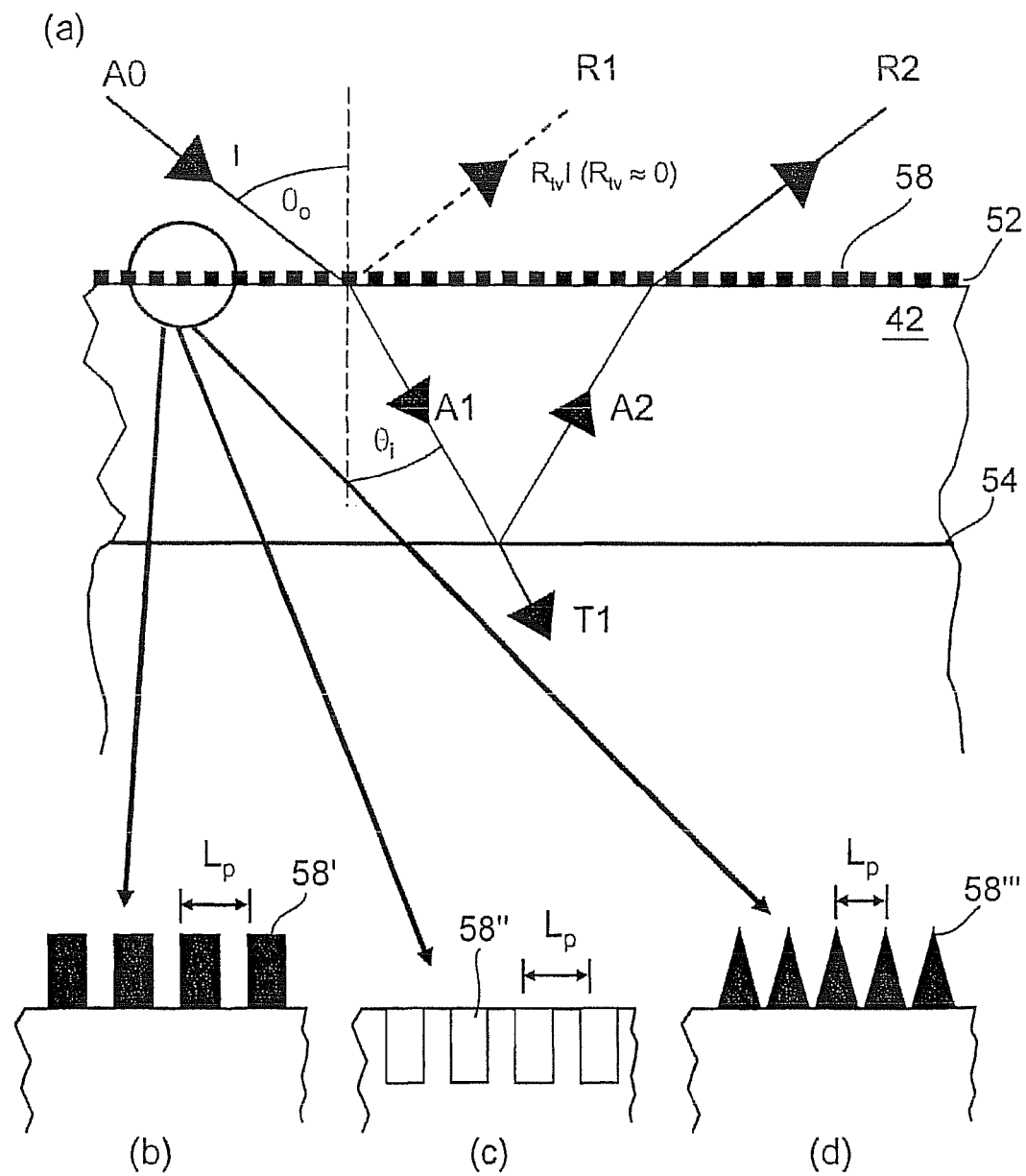
FIG. 10 illustrates an exemplary slab of material and exemplary surface textures.

FIG. 10(a) shows an example where the front surface reflectivity is reduced, but in this case the reflectivity is reduced by forming a surface texture 58 on Lie front surface 52. This texture can function in several ways. In one case, the surface texture can have the same effect as an anti-reflection coating. For example, the texture can lead to a region near the surface where the effective optical properties are a mixture of those of the incident medium and those of the slab of material. The texture can be in various forms, such as an array of protrusions 58' from the surface (FIG. 10(b)), or grooves 58" in the surface (FIG. 10(c)). The grooves can be filled with a second material. The array can be regular (i.e. a repeated pattern with a pitch $L_p$, as shown) or random in nature. The array can be one-dimensional, such as an array of elongated grooves or fins, or two-dimensional, such as an array of pits or pillars. The degree of reflection of the surface can also be reduced by ensuring that the optical properties of the surface region undergo a relatively smooth transition from those of the incident medium to those of the slab of material. This can be done by making the surface texture take a form where the volume fraction of the slab material gradually increases as the incident radiation traverses the surface region into the slab of material. For example, FIG. 10(d) shows a cross-section through array of triangular fins 58''' that achieve this effect. Conical or pyramid-shaped protrusions could produce a similar effect. One of skill in the art will appreciate that such concepts of "graded refractive index" can also be useful for reducing the surface reflectivity when deploying a thin-film coating approach. In order to prevent excessive diffuse reflection from textured surfaces, the length scale of the lateral features of the patterns (e.g. the width of grooves or protrusions) can be made small compared to the wavelength of interest. The pitch of the pattern, $L_p$, can be also be smaller than the wavelength of the light used in the measurements.

Figure 11:
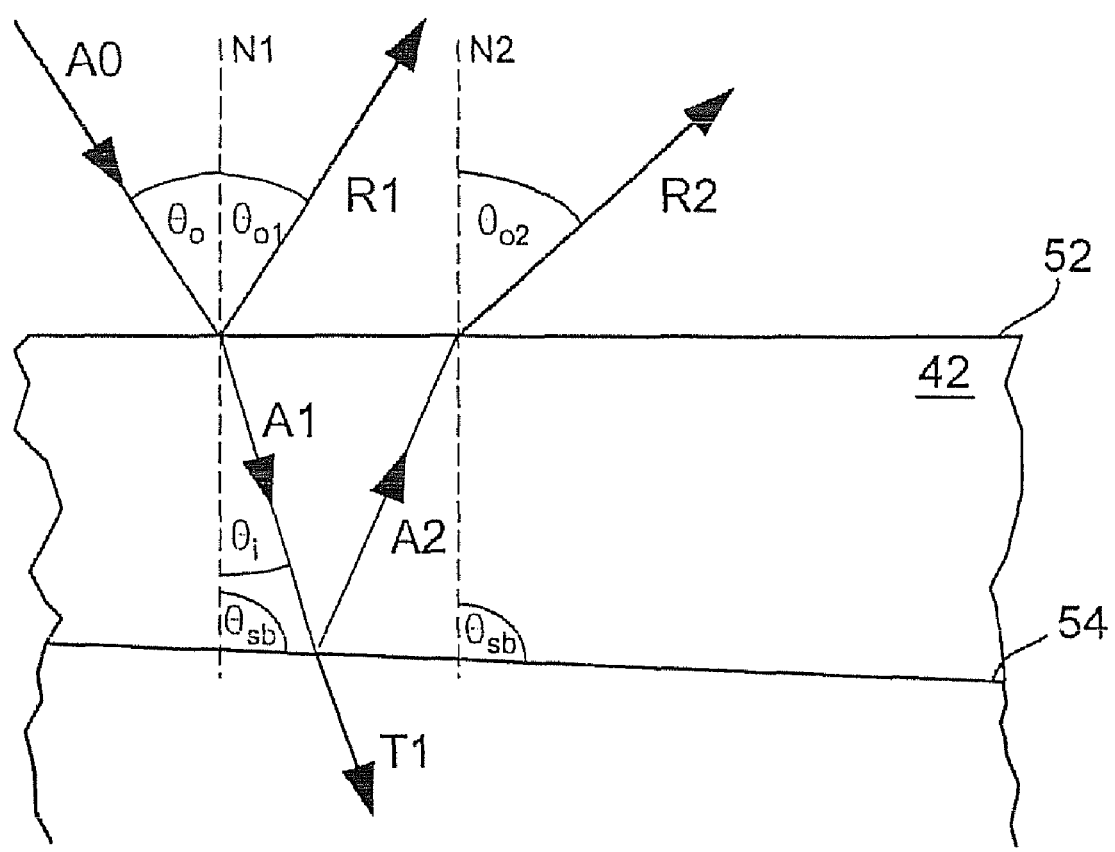
FIGS. 11 and 12 illustrate exemplary slabs of materials including surfaces inclined relative to one another and exemplary rays of light.

FIG. 11 shows an example of a case where the first surface 52 and second surface 54 of the slab 42 are generally not parallel, but instead are inclined relative to one another. In the example shown, the angle $\theta_{sb}$ between the back surface 54 of the slab and the directions normal to the first surface 52, e.g. N1 and N2, is greater than 90°. In this case, the directions of the reflected rays R1 and R2 cease to be exactly parallel, and they take on different angles to the normal. Ray R1 is reflected at angle $\theta_{o1}$, which equals the angle of incidence $\theta_o$. Ray R2 leaves the substrate at a different angle $\theta_{o2}$, because its internal angle of incidence on first surface 52 has been altered by the reflection from the inclined back surface 54. This allows an optical system to separate the energy in ray R2 from that in R1. The separation can be by means of the simple approach shown in FIG. 1, and in this case ray RA of FIG. 1 would correspond to R1 in FIG. 11, while ray RB of FIG. 1 would correspond to R2 in FIG. 11. Hence the detector 34 would intercept energy from ray R2 but not from R1. There is also the useful aspect that it is also possible to collect the specularly reflected component R1. This signal can serve to provide a reference signal that can be used to correct for any variation in the light source characteristics. Many other methods of separating the rays are possible once the beams R1 and R2 are not exactly parallel. For example, a lens can be used to bring the light that is reflected at the front surface to focus at a different location to that reflected from the bottom surface and a detector can be placed at the position where the energy predominantly arises from a reflection at the second surface 54.

Figure 12:
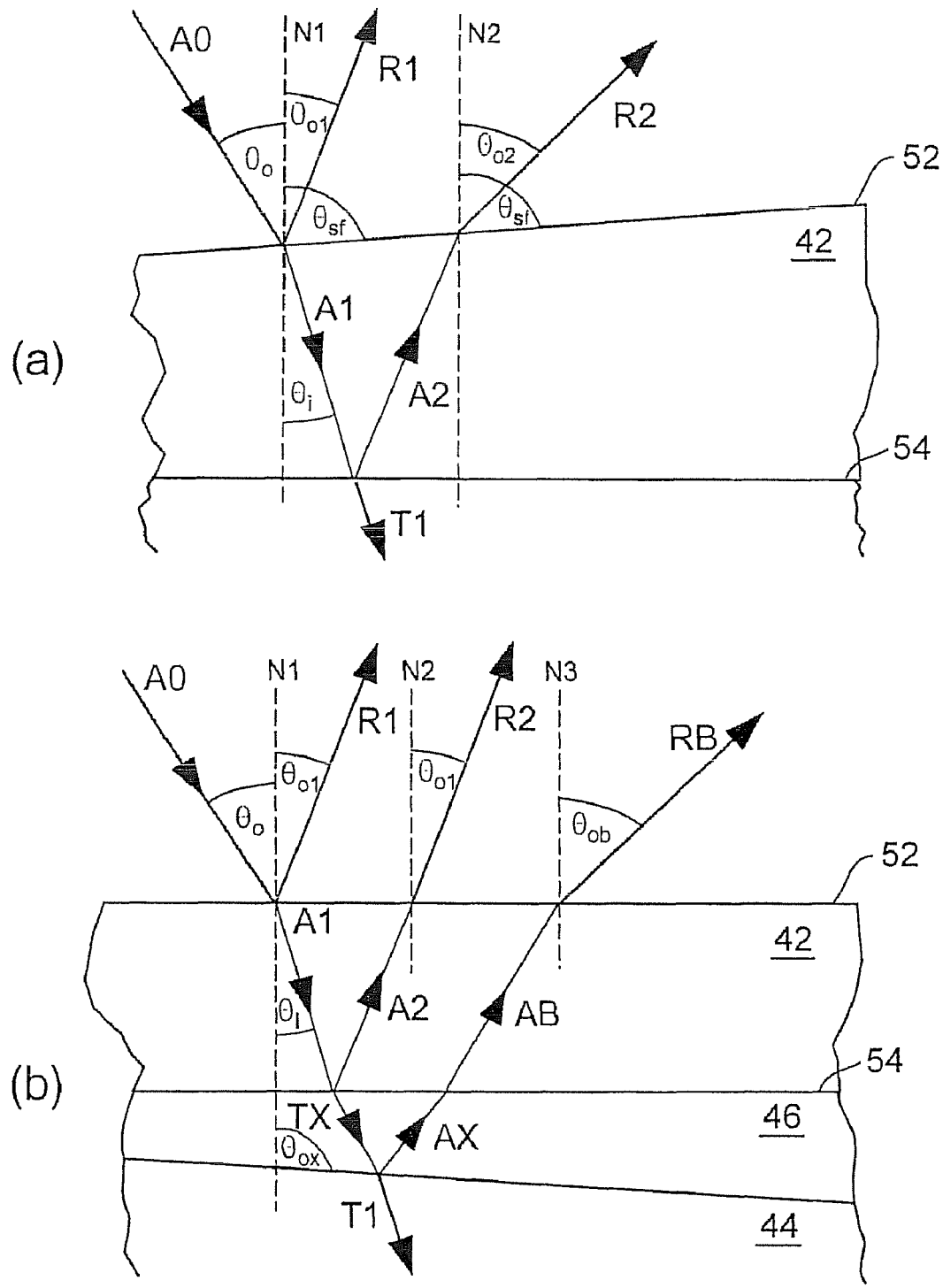

FIG. 12(a) shows a case analogous to FIG. 11, except that in this case the first surface 52 has been arranged to be inclined at an angle $\theta_{sf}$ so that is not parallel to the second surface 54 of the slab 42. Although FIGS. 11 and 12(a) have shown the sloping surface as being one of the slab's surfaces, it is also possible to generate a reflected beam at an angle different to that of R1 by placing a sloping reflecting surface beneath the slab. This may be simpler in some cases, for example if it is difficult to fabricate the slab with a sloping surface. For example in FIG. 12(b), for the example of an SOI wafer, the silicon dioxide layer 46 can be tapered in thickness, making it wedge shaped. In the example shown, the interface between the SOI layer and the substrate is inclined at the angle $\theta_{ox}$ to the normal. The presence of a reflecting interface that is inclined relative to the surfaces of the slab means that when the transmitted ray TX is reflected, it generates a reflected beam, AX. Ray AX becomes an internal ray AB when it enters the slab 42. Since Ray AB is no longer parallel to internal rays such as A2, when it emerges from the front surface of the wafer as a reflected ray RB, its direction is not parallel to R1 or R2, and it leaves the surface at an angle $\theta_{ob}$. Hence it can be separated from the specularly reflected components such as R1 and R2. Since the ray RB results from rays that have traversed the absorbing slab, by monitoring its intensity, it is possible to deduce the strength of absorption in the slab.

Although the examples given here have shown sloping surfaces that are straight, these surfaces could be curved. Furthermore they could act as optical elements that focus the beam of radiation that passes through the slab. For example the curved surface at the back of the slab could form a curved mirror or lens structure that results in radiation from rays such as A1 being focused. Since only the radiation that passed through the slab undergoes such focusing action, the beam that emerges from the surface of the wafer can be distinguished from that formed by rays such as R1, which merely undergo specular reflection at SF. Indeed the back surface of the slab, or a region below it could be altered to form a variety of optical elements that change the direction of rays such as A2 and hence that of rays such as R2. Such optical elements can include lenses, curved mirrors, lens arrays, prisms and retroreflectors. It will be appreciated that, in embodiments of the present subject matter, the radiation may be reflected by an element entirely separate from the slab, such as a sloping mirror (or other element) positioned such that the slab is between the incident ray of light and the mirror (or other element).

Figure 13:
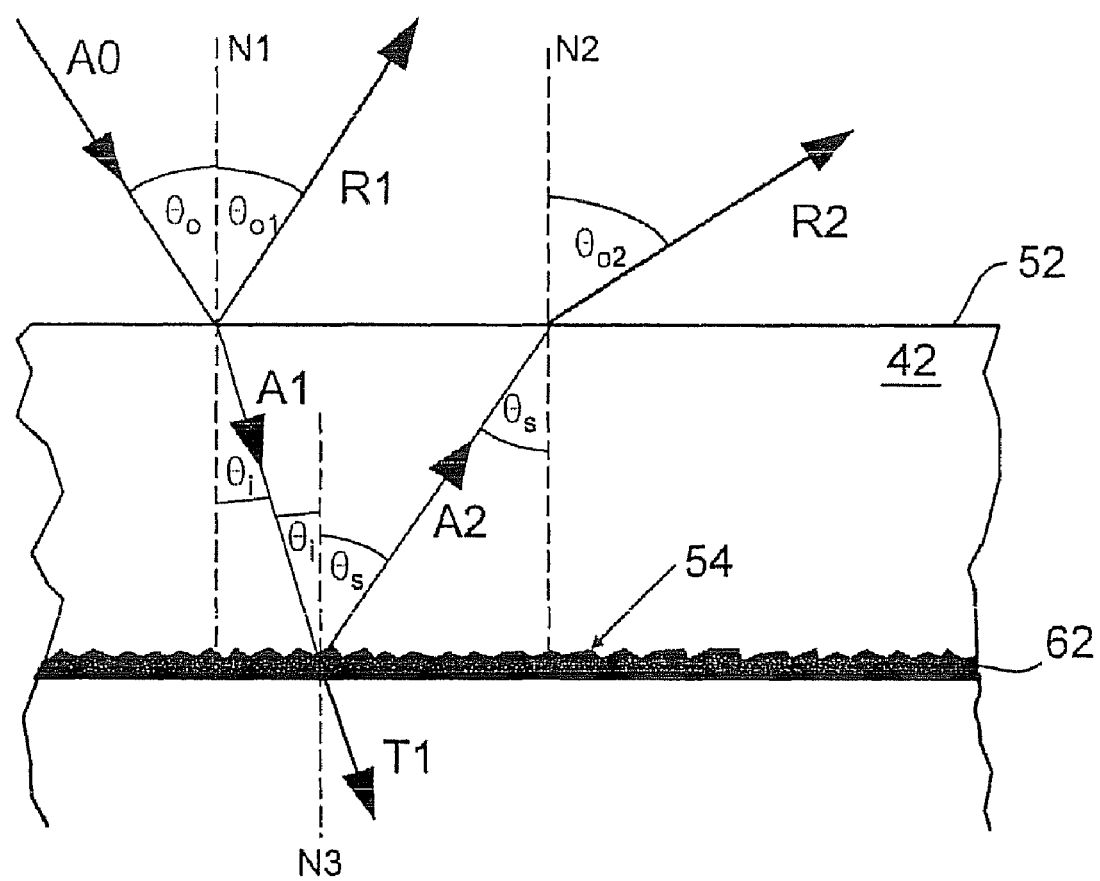
FIG. 13 illustrates an exemplary slab of material including a textured surface.

FIG. 13 shows an exemplary configuration where the light reflected from the second surface 54 of the slab 42 is scattered into directions that are not parallel to the specular reflection at the front 52 of the slab. This case is in some ways analogous to that used in the DRS approach described above and shown in FIG. 6. However, in embodiments of the subject matter disclosed herein, it is ensured that the film of material in the slab is thin enough to allow a reasonable fraction of the radiation reflected at the second surface 54 of the slab to exit the front surface 52 of the wafer even when the wafer is at high temperature. The radiation is detected by a detector positioned so that it can collect light that is reflected from the back surface of the slab, but not from the front surface of the slab. The configuration shown in FIG. 1 can be used, with the sensor 34 being used as a sensor for light that is scattered, rather than specularly reflected. The scattering at the back of the slab can be introduced by introducing a textured interface 62 as shown in FIG. 13. The texture can be formed in the back of the slab, or in a structure below the slab. The main requirement in this configuration is that there is a feature present that leads to light being scattered at an angle, $\theta_s$ that is not equal to the internal angle of incidence $\theta_i$. Such light, represented by ray A2 in FIG. 13, will then emerge from the front surface of the slab in a direction $\theta_{o2}$ which differs from that of the specularly reflected beam, R1, which leaves the surface at angle $\theta_{o1} = \theta_o$. The reflected beams R1 and R2 can then be separated by conventional means as discussed above. There can also be benefits in applying a surface texture at the front surface of the wafer. However this can lead to a more complex situation where the rays incident on the back surface may have been scattered at the front surface, and then may be scattered again as they emerge through the textured front surface. Nevertheless, the net result of using this configuration can be that the pattern of scattering (e.g. the angular distribution of the rays scattered) is different for the rays reflected at the front surface to that for rays reflected at the back surface. As a result it may be possible to distinguish energy from the two reflections.

Figure 14:
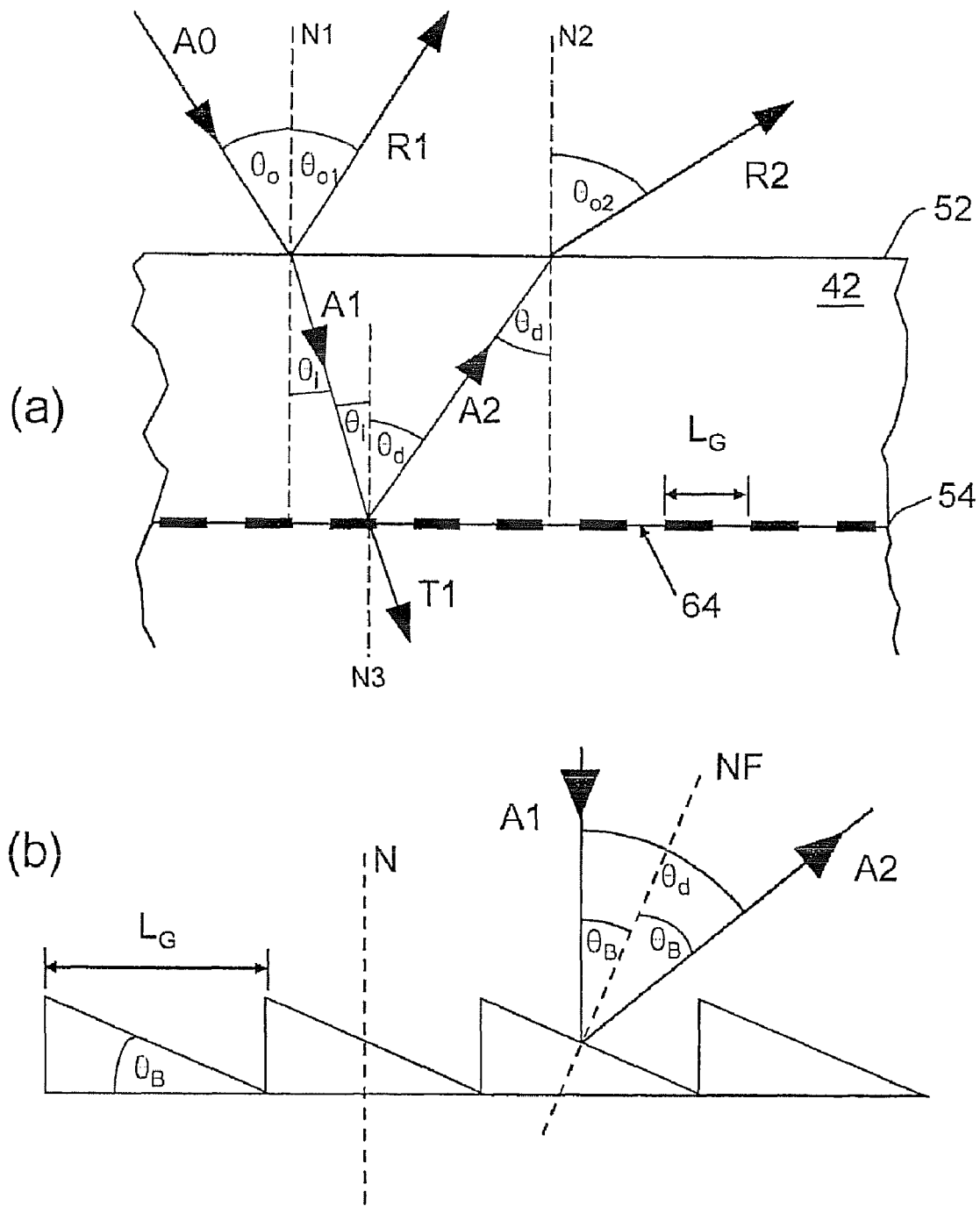
FIG. 14 depicts an exemplary embodiment of a slab configuration that includes a grating structure.

FIG. 14(a) shows a configuration where a grating structure 64 is formed at the second surface 54 of the slab 42. In this case the grating is preferably designed so that it generates at least one ray of reflected radiation that leaves the front surface of the slab in a different direction to that of the specularly reflected beam. This approach is attractive because it allows a predictable direction for the ray R2 that is to be separated from the front surface reflection. The direction of R2 can be controlled through the design of the grating, in particular by controlling the pitch of the grating. For example, the angles at which the ray A2 is diffracted, $\theta_d$, from an array with a period (pitch) of $L_G$ for a beam of light, A1, incident on the array in a medium with refractive index $n_s$ at an angle $\theta_i$ can be predicted from the relationship $$n_s L_g(\sin \theta_d - \sin \theta_i) = p\lambda, \qquad \text{(Eq. 5)}$$

where p is an integer describing the order of the diffracted beam. Many styles of grating are possible, including arrays of lines, fins and grooves of various shapes. A regular, periodic array of lines is just one example of how a grating can be formed. Periodic arrays of two-dimensional shapes, such as rectangles, polygons or discs, can also form the grating. The features of these arrays can be close to planar, such as a pattern formed by patterning a thin film of a material, or they can have a three-dimensional aspect, such as an array of trenches, grooves, cylinders, parallelepipeds, spheres, hemispheres, ellipsoids, cones or pyramids. A grating structure can also be formed from an array of concentric circles. The essential feature of all these embodiments is that they can generate a beam of diffracted radiation. The feature that generates this beam can be at the back of the slab, or it can be at a location below the slab.

In certain embodiments of the present subject matter, the array of support structures shown in FIG. 9 could be used to form the grating structure. Any of the features discussed here can also have an aspect that enhances the efficiency of the diffraction of radiation in the desired direction. For example, they can exhibit a blaze angle in an approach that is analogous to the use of blaze angles in a diffraction grating. FIG. 14(b) illustrates the concept of using a blaze angle. In this example, the blaze angle is applied to the surfaces of the array of parallel grooves. For the case shown a beam A1 is incident on the blazed grating at normal incidence to the plane of the grating. The blaze angle, $\theta_B$ is set to maximize the efficiency of the reflection in the direction of a diffraction angle of the grating, $\theta_d$, as defined through equation 5, e.g. by making $\theta_B = \theta_d/2$. Such concepts of gratings can be combined with approaches that increase the reflectivity of the surfaces. For example, the reflectivity of elements of the grating can be increased by using high reflectivity materials or by applying thin film coatings. The use of gratings also opens the useful opportunity of generating more than one diffracted beam and hence collecting rays reflected at more than one angle from the wafer. Indeed, rays propagating in several different directions could be measured. Since these rays will all have experienced different paths through the slab, extra information can be obtained about the nature of the absorption in the slab. Grating structures can also be applied to the front surface of the wafer in order to optimize the approach.

Furthermore, the grating can also be used to separate wavelengths in an incident beam of light containing more than one wavelength. In such embodiments, several beams like R2 can be generated by diffraction at the grating, with each beam emerging from the wafer with a different value of $\eta_{o2}$. Several detectors (or an array detector) can then be arranged so that they each receive a different wavelength component and measure its intensity. This would greatly facilitate multi-wavelength measurements, and since each wavelength can be guided to a different detector the filtering in front of the detectors could be simplified. This method would allow rapid evaluation of the absorption spectrum of the absorbing slab, in contrast to methods where either the source wavelength is scanned through a sequence of wavelengths and/or where a wavelength selective element is tuned to allow the detector to sequentially sample the intensity at different wavelengths. This can be an important advantage for a scheme where a diffraction grating is deployed at the back of the absorbing layer. It can also show significant benefits relative to a scheme such as the DRS method, where the scattering of different wavelengths happens in a manner that is essentially independent of the wavelength. In DRS, the detector that samples the scattered light is generally exposed to all the wavelengths unless the light is specially filtered. In order to obtain an absorption spectrum with the DRS method the reflected light has to pass through a wavelength filtering element or a wavelength dispersive element such as a grating, a tunable filter or a prism.

Figure 15:
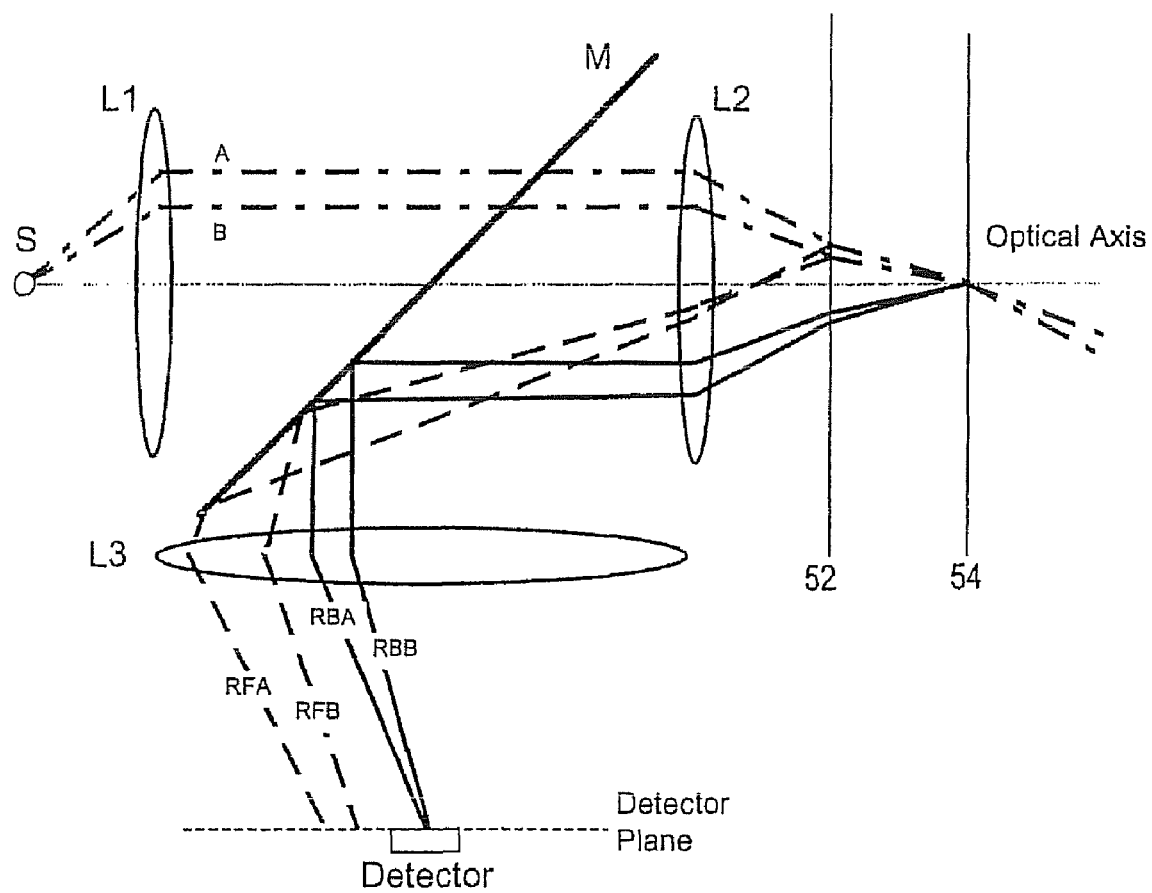
FIG. 15 shows an exemplary light focusing arrangement which may be configured to separate energy from selected reflections for detection.

FIG. 15 shows an example where the separation of energy reflected from the first surface 52 from that reflected from the second surface 54 is achieved through the use of a light focusing arrangement. An optical system, which may comprise, for example, optical components such as the illustrated lenses and mirrors, is used to separate components of radiation reflected at the two interfaces of the slab of silicon. The figure shows how two rays, A and B, emitted from a source of light S propagate through the optical system. They are collimated by a lens L1, and then focused by a lens L2. The focal length and position of L2 are set so that an image of the source S is formed at the back surface of the slab, SB. The rays A and B form rays that are reflected at the front surface of the slab, RFA and RFB. They also form rays that are reflected at the back surface of the slab, RBA and RBB. All of these rays pass back through lens L2, are reflected by a beam-spitting mirror M and then are collected by a lens L3. The lens L3 brings rays RBA and RBB to focus at a detector. Hence an image of the source S is formed on the detector, after reflection from the back surface of the wafer. In contrast, the rays RFA and RFB are not in focus at the detector. Hence the signal from the detector is strongly affected by the reflection in the back surface of the slab. By measuring the component of light that is reflected at the back surface it is possible to deduce the degree of absorption in the slab.

Figure 16:
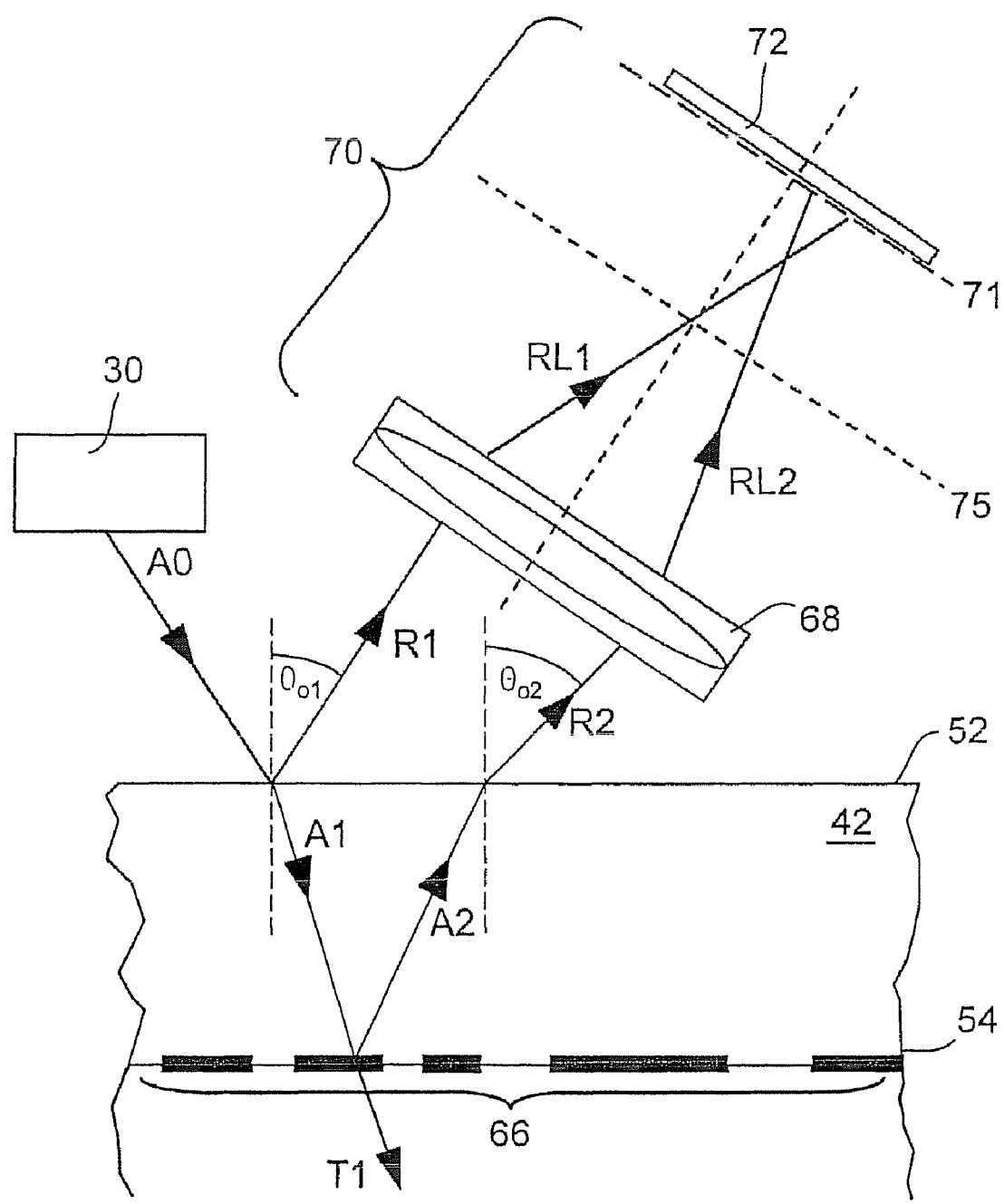
FIGS. 16 and 17 illustrate an exemplary slab that includes a pattern and exemplary systems to image the pattern.

FIG. 16 shows an example of a configuration that has some similarities with those in FIG. 14(a) and FIG. 15 above. However, in these embodiments, a pattern 66 is formed at the second surface 54 of the slab 42 and an imaging system 70 is used to image the pattern onto a detector 72. In this case, the degree of absorption in the slab is assessed by observing the degree of contrast observed in an image of the pattern 66 that is formed using the optical imaging system 70. The imaging system 70 will, of course, be connected to further apparatus (not shown) such as, e.g., a computer and/or a display to provide an operator with a view of the image; the computer may be configured to evaluate the degree of contrast in the image and provide other analysis functions. The contrast in the image describes the amount of variation of light intensity observed in the image plane. As the temperature of the wafer rises, and the slab becomes more absorbing, the magnitude of the contrast in the image of the pattern diminishes, until the slab is effectively opaque and the pattern can no longer be observed. A measurement of contrast in an image is attractive, since it automatically corrects for variations in the characteristics of the light source illuminating the wafer. Such an approach may also be able to improve the sensitivity for detection.

Figure 17:
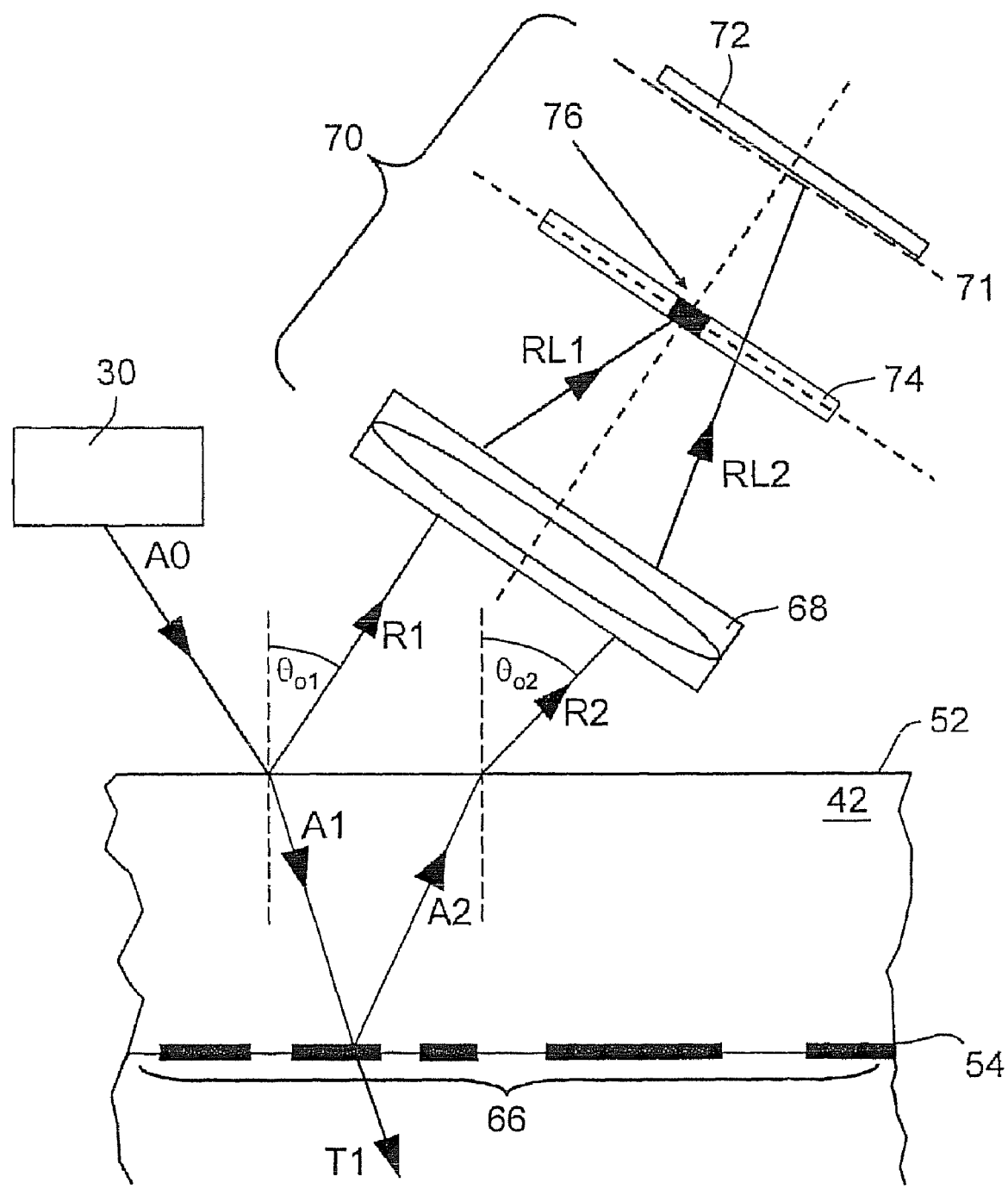

FIG. 17 shows one example of a method for improving the ability to measure the contrast in the image. In this case, the wafer is illuminated with radiation at the wavelength of interest, and the reflected light is imaged with a lens 68 in order to form an image at an image plane 71. As in the case of FIG. 16, the image can be analyzed by an imaging device 72, such as a camera, or by an array of photodetectors, or by scanning it over a single photodetector. As the temperature rises, the contrast observed decreases and the temperature can be sensed by quantifying the relationship between the loss of contrast and the temperature of the wafer.

One practical problem with such an approach could be that a large amount of light that is reflected at the front surface of the wafer will also enter the optical imaging system. Although this light is not brought to focus at the image plane, it contributes a background "stray light" signal that may decrease the contrast observed in the image plane and hence make measurements more difficult. One approach for reducing this problem is to insert a spatial filter 74 in the optical path between the pattern 66 and the imaging device 72. For example, this filter can be inserted at the focal plane 75 of the imaging lens 68, as shown in FIG. 17. The distribution of light in the focal plane depends on the spatial frequencies that characterize the pattern being imaged. The spatial frequency describes the various length scales in the pattern. For example the pitch of a grating pattern represents one significant spatial frequency. The lengths of elements and spaces within a pattern may introduce other spatial frequencies. The light that is reflected by the front surface of the wafer has a very low spatial frequency, since there is no pattern present there, and in effect it represents a "dc" background. The approach of using a spatial filter can eliminate this background signal, leaving higher spatial frequencies. One way of doing this is to place an opaque blocking element 76 on the central axis of the lens, in its focal plane, as shown in FIG. 17. If a grating is used as the pattern then a suitable spatial filtering approach can involve placing a mask in the focal plane of the lens, which selectively blocks spatial frequencies other than that corresponding to the pitch of the grating pattern. The advantages of these spatial filtering techniques are that they prevent large amounts of background light from reaching the detector in the image plane. The background light contributes no information about the absorption in the slab, yet it can contribute noise to the signals being measured. It also greatly decreases the contrast in the image and limits the range of signals that can be analyzed by the detection system. Hence preventing background light from reaching the detector may be very helpful in improving accuracy.

The method of using the degree of contrast in an image to characterize wafer temperature can be applied for various approaches. For example, the contrast may be observed in a reflected light signal or a transmitted light signal. It may also be observed in an emitted light signal. The latter approach has an added advantage that no external light source is needed, simplifying the apparatus. Nevertheless, in certain cases the measurement may be easier to perform at the desired temperature if an external light source is used, because the magnitude of thermally emitted radiation is very strongly dependent on the wafer temperature. This approach could be used for temperature measurement on patterned wafers.

For example, the patterns on the front of the wafer could be viewed through the wafer thickness by observing them with an imaging system that looks at the back of the wafer. In this case, the degree of contrast observed in an image of a region of the wafer can be used as the temperature indicator. This has the advantage of not requiring the wafer to be specially patterned, since the devices being processed provide the necessary contrast themselves. Such an approach may also be applicable in situations where the wafer is rotating. In this case the fluctuations associated with rotation of the pattern as observed by an imaging system could themselves be used as a temperature indicator. As the wafer warms up, the degree of fluctuation observed by the imaging system reduces, because less light comes back to the imaging system from reflections at the device side of the wafer. By selecting signals that vary with time at the rotation frequency, it is possible to improve the sensitivity of such a detection system to the effect of the rotating pattern. Such filtering can be achieved by a band-pass filter whose pass band is centered on the wafer rotation frequency. The method can be combined with an optical approach of spatial filtering, in order to discriminate against light that is reflected at surfaces other than the patterned device regions.

In some embodiments, the observed patterns may be on the front side of the wafer and viewed through the wafer thickness, or may lie within the wafer, with the degree of contrast largely a function of the changing absorption of material lying between the pattern and the imaging system. In alternative embodiments, the material forming all or part of the pattern may be sensitive to temperature changes. For example, all or part of the material forming the pattern may become more or less transparent as temperature changes, change in refractive index, change in light scattering effect, vary in reflectance, absorptance, emittance, transmittance etc. Furthermore, for example, patterns may be devised to exhibit different combinations of the temperature-dependent changes.

Another method for distinguishing light reflected at the front of the slab from that reflected at the back is to illuminate the wafer surface with a pulse of light and to detect the times when reflected pulses of light arrive at a detector. The fraction of the pulse that travels through the surface of the slab and is reflected at the back surface will arrive at the reflected light detector a finite time after the fraction of the pulse that is reflected at the surface of the wafer. Such a measurement is quite challenging, because the time for light to propagate through the slab is relatively short. The speed of light in silicon is $c/n_{si}$, where c is the speed of light in a vacuum and $n_{si}$ is the refractive index of silicon, which is ~3.6 at 1.55 μm wavelength, so the speed of light in silicon is ~$8.3 \times 10^7$ m/s. Hence for a slab of silicon that is 100 μm thick, the time to travel through the thickness and back to the front surface of the slab is ~$200 \times 10^{-6}/8.3 \times 10^7$ s=~2.4 ps. Although this is a very short time, in principle, the use of short pulse of light should enable measurements to discriminate between the locations where the light is reflected.

The configurations described above can be used in combination in order to get the most accurate temperature readings. For example, a wafer can have an anti-reflection coated front surface with a highly reflecting grating at the back surface of the slab. The wafer can be illuminated with p-polarized radiation, incident on the front surface at Brewster's angle for the particular wavelength used in the measurement. The light that is diffracted by the grating at the back surface can be collected by a detector that is configured and/or positioned so as to not collect specularly reflected light.

For many applications the SOI wafer structure will be suitable for high temperature calibration. Typically a wavelength of ~1.55 μm can be used for the measurements, since silicon exhibits relatively low absorption at this wavelength, and hence silicon films that are not too thin can be used in the SOI layer. The reflection approach generally utilizes sensed radiation that has passed through the film thickness twice (or more), so it is desirable for the absorption to be relatively low, as compared to the situation that applies in a transmission measurement, where the measured radiation need only pass through the slab thickness once. Although wavelengths near 1.55 μm are especially useful for measurements, the approach described here may be useful for a wider range of wavelengths, typically for wavelengths between 0.8 and 4 μm.

It is generally preferred that the film of silicon (or other material) that serves as the absorbing slab 42 is not too thin, because for a very thin film the nature of the surfaces becomes more important, and these regions may exhibit optical characteristics that differ from those of the bulk of the silicon slab. This is especially true when the surfaces are in contact with other materials that may introduce stresses in surface regions. In the SOI structure, such conditions may apply near the oxide layer. Forming very thin films of crystalline silicon may also be quite difficult in certain circumstances, and thus it may be hard to maintain consistent results. Another advantage to using relatively thick films of silicon is that this makes it easier to wavelength-average over the oscillations in optical properties that are introduced by interference effects in the slab. Another advantage of using a relatively thick film is that it allows the film thickness to be determined with a very high degree of accuracy, especially if an optical method is used to measure the film thickness, as described below. Yet another advantage is that a thicker film can be very opaque for short wavelengths of radiation, especially for wavelengths <~1 μm. This can be an advantage because the lamp heat sources that heat the wafer typically radiate strongly at these short wavelengths. If the silicon film is very thin, the power coupling of the lamps to the wafer may be affected by the presence of the interface beneath the silicon slab that reflects the light at the back of the slab. In such cases, the heating cycle of the wafer would be affected, which may be undesirable, especially if it leads to thermal non-uniformity across the surface of the wafer. Typical thicknesses for the silicon film are in the range between 1 μm and 300 μm. For high temperature calibration, the silicon film would normally be more than 10 μm thick, but less than 100 μm thick. A typical thickness would be ~50 μm.

However, despite the advantages of thicker films in certain circumstances as discussed above, one of skill in the art will recognize that in other circumstances thinner films may nonetheless be preferable.

The oxide layer thickness in the SOI structure is typically in the range between 0.001 μm and 100 μm, and it would normally be less than 1 μm thick. The exact thickness can be optimized to make the reflectivity of the back surface of the slab as high as possible. A typical value for the oxide thickness is ~0.3 μm for a measurement wavelength of 1.55 μm. There can be an advantage in using a relatively thin oxide layer, since a thin layer has less capability for introducing undesirable thermal stresses in the wafer during heating.

The substrate thickness is mainly determined by mechanical constraints, but for typical applications it should be of a thickness that allows the combination of the substrate, the oxide layer and the absorbing slab to be between 200 μm and 2 mm thick. Typically the combination would be 775 μm thick, which is the thickness of a standard 300 mm diameter wafer.

The doping of the silicon slab at the surface would usually be selected so that it is easy to reproduce a known temperature dependence in the absorption coefficient of the silicon slab. One way to do this is to select a lightly doped silicon slab. For example, the doping can such that the resistivity, p, of the silicon is greater than ~0.1 Ωcm, and preferably greater than 1 Ωcm. The doping in the substrate can be selected for convenience. If it is desired that the wafer should be only used for high temperature calibration (e.g. at temperatures greater than 800° C.), then any normal doping level is acceptable, because the substrate will become opaque at high temperatures and there will be no reflection from the back of the wafer to affect the measurements. If the approach is to be used only at low temperature then it is simpler if the substrate is opaque, and a heavily doped wafer with $\rho<0.05$ $\Omega$cm should be used. For improved opacity in the infra-red wavelength range, ideally $\rho<0.02$ $\Omega$cm.

If a lightly doped wafer is used, embodiments of the reflectance-based methods disclosed herein can be combined with other calibration methodologies, including transmission-based temperature calibration, such as those described as in U.S. patent application Ser. No. 10/178,950, to yield still further embodiments. In such further embodiments, a measurement of transmitted light can be used to determine the wafer temperature up to the limit set by the fall-off in transmitted light signal, which is typically ~850° C. for measurements at a wavelength of 1.55 μm. Above this temperature, the reflection-based approach can be used. This approach brings several advantages. Firstly, it reduces the number of wafers that need to be used to perform a calibration procedure. Secondly, the temperature deduced from the transmission measurement can be used to improve the accuracy of the reflection-based measurement. This can be done by ensuring that the two measurements agree at a particular temperature. This cross check allows the high accuracy of the transmission-based approach to be extended to the reflection-based approach that has to be used in the high temperature regime.

Figure 18:
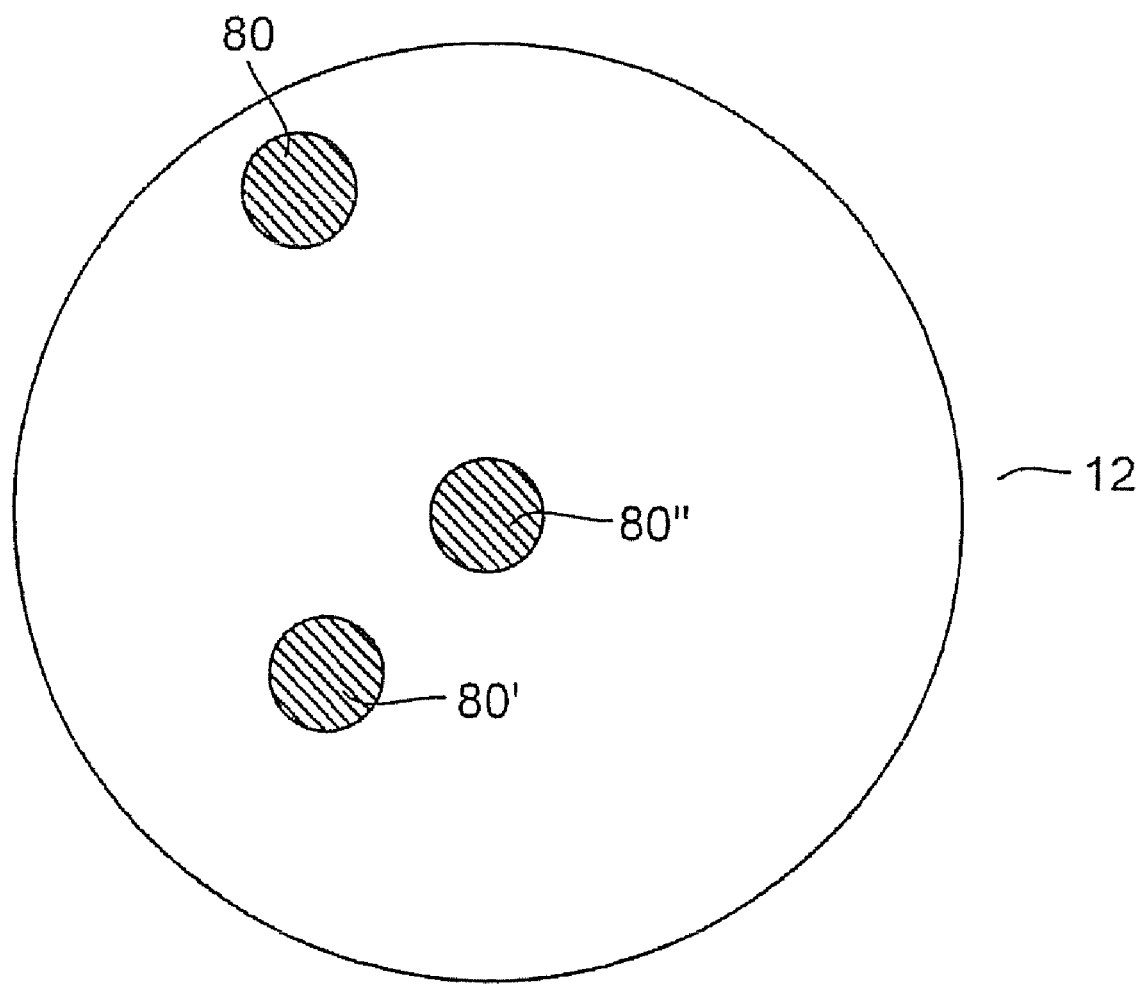
FIG. 18 shows an exemplary calibration wafer that includes selected areas adapted for use in reflectance-based measurements.

The structures utilized for the reflection-based measurement approach do not necessarily need to exist across the entire surface of the wafer. For example, FIG. 18 shows a plan view of a wafer 12 that includes three regions 80, 80', and 80" that have been modified to allow the reflection-based measurement approach to be used. These regions may coincide with the locations viewed by pyrometers that observe the wafer temperature. The regions may be modified by the formation of the SOI structure in these regions, and the deployment of coatings, gratings, textured surfaces, sloping surfaces and other features described in this disclosure. Multiple measurement sub-systems, each with an associated set of light sources and optical detectors such as the set suggested in FIG. 1 may be deployed to enable the measurements in each of the locations where a pyrometer needs to be calibrated. Furthermore, transmission measurements can be performed either in the same location, or at locations near them. There may be situations where it is best to perform the transmission-based measurement at a region where some of the structures used in the reflection-based approach are not present. For example such structures could degrade the quality of the transmission-based measurements by scattering light. In this case the transmission-based measurement can still be performed at a location that is near the point where the reflection-based measurement is performed, and a cross calibration between the two methods, and a corresponding calibration of the pyrometer can still be performed. For this to be possible it is best that the lateral separation of the measurement locations is less than the thermal diffusion length criterion that was set out in U.S. patent application Ser. No. 10/178,950.

For these methods to be accurate, it is preferable in some embodiments that the thickness of the absorbing layers used is known with a high degree of accuracy. The thickness can then be provided as an input to an algorithm in order to determine the degree of the absorption that corresponds to the measured reflectance or transmittance, and hence to deduce the wafer temperature. The algorithm can additionally or alternatively consider other factors, for example, the resistivity, as well. The thickness, resistivity, and/or other factors may be measured using any known method.

For the reflection-based measurement, the thickness of the surface layer of the SOI structure can be determined either during the manufacturing process or afterwards. For example, the thickness can be determined by measuring a high-resolution reflection spectrum of the wafer in the infra-red region where the silicon film is transparent. The reflection spectrum will display oscillations in reflectance that arise from interference effects within the silicon film, as described above. The methods of thin film optics can then be combined with knowledge of the refractive index of silicon to obtain a very accurate measurement of the thickness of the silicon layer. In some of the configurations discussed above, the features introduced in order to reduce the front surface reflection would also reduce the interference effects. This might make it more difficult to make the film thickness measurement. In such cases, it may be easier to perform the measurement of silicon thickness at a point in the manufacturing process before such measures are implemented.

It will be appreciated by one of skill in the art that reflection-based measurements, such as the examples discussed herein, may be used to create a temperature uniformity map across the surface of a wafer. For instance, several reflectivity measurements could be performed simultaneously or sequentially in a plurality of different areas across the surface of the wafer. The wafer could include specialized regions for ease in separating the measurements, or could be homogenous across its surface. Process uniformity could be improved or optimized by observing such temperature differences.

Difficulties with temperature measurement methods that are based on optical absorption ($\alpha(\lambda,T)$) may arise when the absorption is so strong that the specimen being used becomes effectively opaque. For example, a 300 mm diameter silicon wafer that is typically ~775 μm thick, transmits very little radiation at any wavelength when its temperature exceeds ~900° C. Aspects of certain approaches, such as the earlier-referenced transmission-based approaches, include the use of very thin silicon wafers, which may comprise one example of a way to address the opaqueness problem. The discussion above can also provide improvements where a measurement of reflected radiation is used to provide the temperature calibration. However, still further improvements may be preferred in applications where extremely accurate temperature calibration is required at high temperatures. Exemplary embodiments of such a method for providing an accurate calibration at high temperature will therefore now be addressed.

Such embodiments may share some characteristics with the reflectance- and transmission-based approaches. However, embodiments the present subject matter as described below utilize a combination of an optical absorption measurement and a measurement that is sensitive to the optical thickness of a layer. Embodiments of this combination may thus provide the ability to provide an absolute temperature measurement of very high accuracy. One exemplary way to implement the approach is through a scheme wherein measurements of wafer characteristics are obtained through the use of beams of light at approximately the same wavelength but with different degrees of temporal coherence.

As well as the above-referenced U.S. patent application Ser. No. 10/178,950 and discussion above, there are various methods relating to the use of measurements of the optical properties to deduce temperatures, especially in the field of semiconductor processing.

As noted earlier, generally a measurement of optical absorption may used to deduce a wafer temperature. This method has the virtue of providing a very accurate temperature measurement. The method can also provide an absolute temperature measurement, because the optical absorption at a given wavelength is uniquely defined at any given temperature in a given material. It may be implemented by using, for example, reflection or transmission measurements to deduce the optical absorption. However, since this absorption can be very strong at high temperature, it can become difficult to implement, at least when using wafers of standard thickness. The examples described earlier in the present disclosure may be able to overcome such potential difficulties by using a reflection-based approach.

Another possible method of determining temperature is based on a measurement that is sensitive to the optical path length through a sample, which can also be described as an optical thickness. The change in the phase of an electromagnetic wave as it travels through a medium is related to the product of the real part of the refractive index of the medium, $n_m$, and the distance traveled, d, which is the optical path length, $n_m d$. In a medium where the real part of the refractive index is sensitive to temperature, this optical path length through the medium changes as the temperature changes. Furthermore in any material with a finite coefficient of thermal expansion, the optical path length of a ray that travels between boundaries of the medium will also change when the physical dimensions of the material change with temperature. Hence any measurement method that is sensitive to the optical path length of a ray of energy passing through the material can be used to sense the temperature of the material. Typically this approach has been implemented by measuring the reflectance, R*, or the transmittance, S* of a slab of material, such as slab 50 as shown in FIG. 2. R* and S* are strongly affected by the interaction between rays of light reflected at the two boundaries of the slab, as a result of interference effects. The interference phenomenon arises because of the wave nature of the light, and it depends on the relative phase of waves that are reflected at the two surfaces of the slab. Since the relative phase of waves reflected at the two surfaces of a slab is determined by the difference in the optical path lengths traversed by these rays it is strongly affected by temperature.

One of skill in the art will recognize that an optical-path-length-based approach generally requires that the light that is detected in the measurement acts in a coherent manner, since the phenomenon of interference hinges on the relationship between the phases of the waves that are reflected at two interfaces. The phase relationship is only well defined in the case where the waves act in a temporally coherent manner. In practice this means that for a medium that is reasonably thick, such as a standard silicon wafer that is ~775 µm thick, the measurement must be carried out using a coherent light source such as a laser, which emits a very narrow range of wavelengths. The light can be treated as being coherent if the wavelength range of the light that is measured, $\Delta\lambda$, is small enough. One criterion is that $$\Delta\lambda << \frac{\lambda^2}{4 n_m d_m}, \quad \text{(Eq. 6)}$$

where $n_m$ is the refractive index of the medium that makes up the slab, and dm is its thickness. For a wafer that is 775 µm thick, considering the wavelength of 1.55 µm and assuming that $n_m$ corresponds to that for silicon and is ~3.6, Eq. 6 indicates that $\Delta\lambda$ needs to be much smaller than 0.2 nm in order for the light to be treated as being coherent. For a thinner film, the requirement is less stringent. For example, for the same conditions but with a thin film of silicon that is 10 µm thick, then $\Delta\lambda$ need only be much smaller than 16 nm. Optical-path-length-based measurements can also be performed with a relatively incoherent source of radiation, which emits a wider range of wavelengths, provided that the optical detection system includes a filter that only allows a very narrow range of wavelengths to contribute to the detected signal. In this case the filter bandwidth would have to be limited to a range similar to $\Delta\lambda$. This approach is practical for reasonably thin films, such as the 10 µm-thick silicon film discussed above, but may become very difficult to use if the distance between the surfaces of the slab is large, because the requirement for an extremely narrow-band filter prevents most of the energy from reaching the detector and leads to an impractically low signal level.

This discussion illustrates an important concept regarding the optical characteristics of the radiation that is sensed in the measurements discussed in this disclosure. The concept is that of the coherence length of the radiation. The coherence length, $d_{coh}$, describes the maximum interval along a ray of light traveling in a medium with refractive index $n_m$ where the phase of the electromagnetic wave at the beginning of the interval maintains a fixed relationship to that at the end of the interval, as prescribed by the wave equation. For an interval along a ray that is significantly longer than the coherence length these is no predictable relationship between the phases of the wave at the two ends of the interval. The coherence length is typically characterized by the definition $$d_{coh} = \frac{\lambda^2}{n_m \Delta\lambda}, \quad \text{(Eq. 7)}$$

where the symbols take the meanings discussed above. This criterion is closely related to that given in equation (6). Radiation with a coherence length that is long relative to the path length through a slab can be easily used to observe interference effects in that slab, whereas measurements based on the observation of radiation with a coherence length that is short relative to the path length through the slab will not demonstrate such effects. In this disclosure the term coherent is used generally when discussing situations where the rays of radiation passing through a medium interact in a manner where they maintain a well-defined phase relationship, and the term incoherent when L that criterion does not apply. Likewise a "coherent measurement" is one that relies on the detected radiation acting in a coherent manner and an "incoherent measurement" is one that relies on the detected radiation acting in an incoherent manner.

One advantage of temperature measurement approaches based on optical path length measurements is that they can be extremely sensitive to temperature, especially when the physical path length through the semiconductor wafer is relatively large. However there are several potential difficulties with the approach. The first problem is that it is oftentimes extremely difficult to use the approach to determine the absolute temperature of the wafer. This is because the reflectance and transmittance tend to be periodic functions of temperature, and hence any particular reflectance or transmittance value could correspond to many different temperatures. A second problem is that the reflectance and transmittance are also extremely sensitive to both the thickness of the layer and its refractive index. Hence, in order to characterize the absolute temperature dependence of the optical properties of a given slab it is generally necessary to determine both these quantities with an extraordinary degree of absolute accuracy. In principle, for any given slab of material, such problems could be overcome by characterizing the reflectance and transmittance of that particular slab as a function of absolute temperature, but this would make for a rather cumbersome approach in practical applications. Furthermore, it would not resolve other issues, such as the fact that the reflectance and transmittance are also very strongly affected by the angle of incidence of the radiation, largely because this directly affects the optical path length through the layer. In practice most temperature measurement schemes that have been proposed based on the effect of a changing optical path length have been used to measure changes in temperature. This can cause problems when tracking the temperature of a wafer during a semiconductor processing step, if the initial temperature of the wafer is not known accurately. A final problem, which will also be addressed below is that, at least in semiconductor materials, optical absorption rises rapidly at high temperatures, and eventually the ray that passes through the layer is so strongly attenuated that it no longer produces a significant effect on the reflectance or transmittance. The latter problem mirrors the difficulty in using transmission measurements at high temperatures that was mentioned earlier.

Embodiments of the method of the present subject matter include those in which at least one of the materials in the wafer whose temperature is to be determined has the characteristic that its optical absorption at a known wavelength varies with temperature, and those in which at least one of the materials has the characteristic that its optical thickness at a known wavelength varies with temperature. The two wavelengths mentioned can be the same, but this is not essential. The two materials can also be same, but this is also not essential. The method relies on using a measurement of the absorption characteristic to determine an absolute temperature value. It also relies on using the temperature variation of the optical thickness to determine a change in temperature. The combination of the accurate measurement of the absolute temperature and the accurate measurement of the temperature change enables the creation of an accurate temperature scale covering a wide range of temperatures.

The approach can be used for a single slab, such as that shown in FIG. 19(a), in the case where the slab contains a material whose optical absorption at a wavelength varies with temperature and whose optical thickness varies with temperature.

FIG. 19(b) shows another example of a structure that can be used to perform the calibration. The structure has two layers. One of the layers can provide the temperature-dependent absorption and the other can provide the temperature-dependent optical thickness.

Other embodiments (not shown in FIG. 19) include multilayer structures in which one layer provides a temperature-dependent optical thickness and a combination of that layer with another layer (or layers) provide an optical absorption that varies with temperature, or vice-versa. Additionally, it will be appreciated that, for example, various or all the layers shown in FIG. 19 could be implemented using multilayer structures.

The structure used in the calibration procedure can also take more complex forms, such as the example shown in FIG. 19(c). In this case, an extra layer is included. The extra layer can be used to generate a reflected wave. This configuration may be useful, for example, in cases where the surface layer and the substrate are materials with very similar optical properties and hence where there would not normally be a strong reflection at their interface.

For an example of how the measurements can be performed, attention is briefly directed again to FIG. 1. As noted above, FIG. 1 illustrates an exemplary RTP process chamber 10, where the wafer 12 is heated by banks of lamps 14 and 16. In the example shown the banks of lamps are both above and below the wafer. The chamber 10 further includes at least one light source 30, and can include various sensors such as those illustrated at 32, 34, 38, 38, and 40, or in other suitable configurations.

Figure 20:
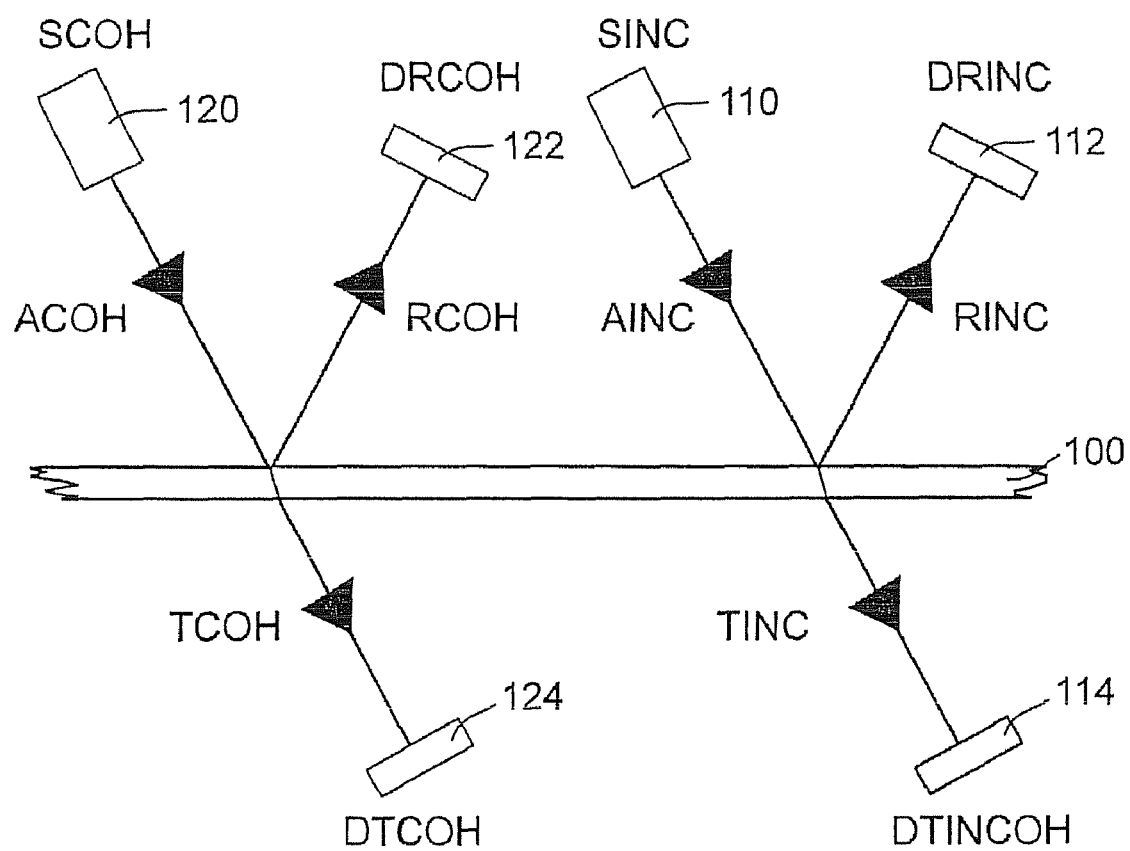
FIG. 20 illustrates an exemplary illumination and detection arrangement.

FIG. 20 shows aspects of an exemplary embodiment of the measurement approach in more detail, in this case illustrated for a wafer 100 taking the form in FIG. 19(a). It should be noted that the wafer may also have surface coatings or patterns on either or both of its surfaces, although these are not shown in the figure. The figure shows a ray from a source 110, which emits radiation AINC that is incoherent. This radiation can be used to determine the degree of absorption in the substrate 100, either by means of a reflection measurement using RINC or a transmission measurement using TINC. Appropriate signals for such measurements are collected by the detectors 112 (collecting reflected incoherent energy RINC) and 114 (collecting transmitted incoherent energy TINC). The apparatus also has a source 120 which emits radiation ACOH that is coherent. This radiation can be used to determine a change in the optical path length through the wafer. For example, the path length may affect the reflectance or transmittance of the wafer. Appropriate signals for measurement of these quantities are collected by the detectors 122 (collecting reflected coherent energy RCOH) and 124 (collecting transmitted coherent energy TCOH). In some cases, the source 110 may be the same source as 120. In such a case, the wavelength range detected by the detectors used for reflectance or transmittance measurements can be adjusted to a condition suitable for measurements of coherent or incoherent light. Such adjustment is possible by selecting an appropriate optical bandwidth for the filters in front of the detectors. For the coherent radiation measurement a narrow band filter would be used, whereas for the incoherent radiation measurement a wider band filter would be used. Hence it is possible that the detector 112 could also serve as the detector 122, and the detector 114 could also serve as the detector 124.

Figure 21:
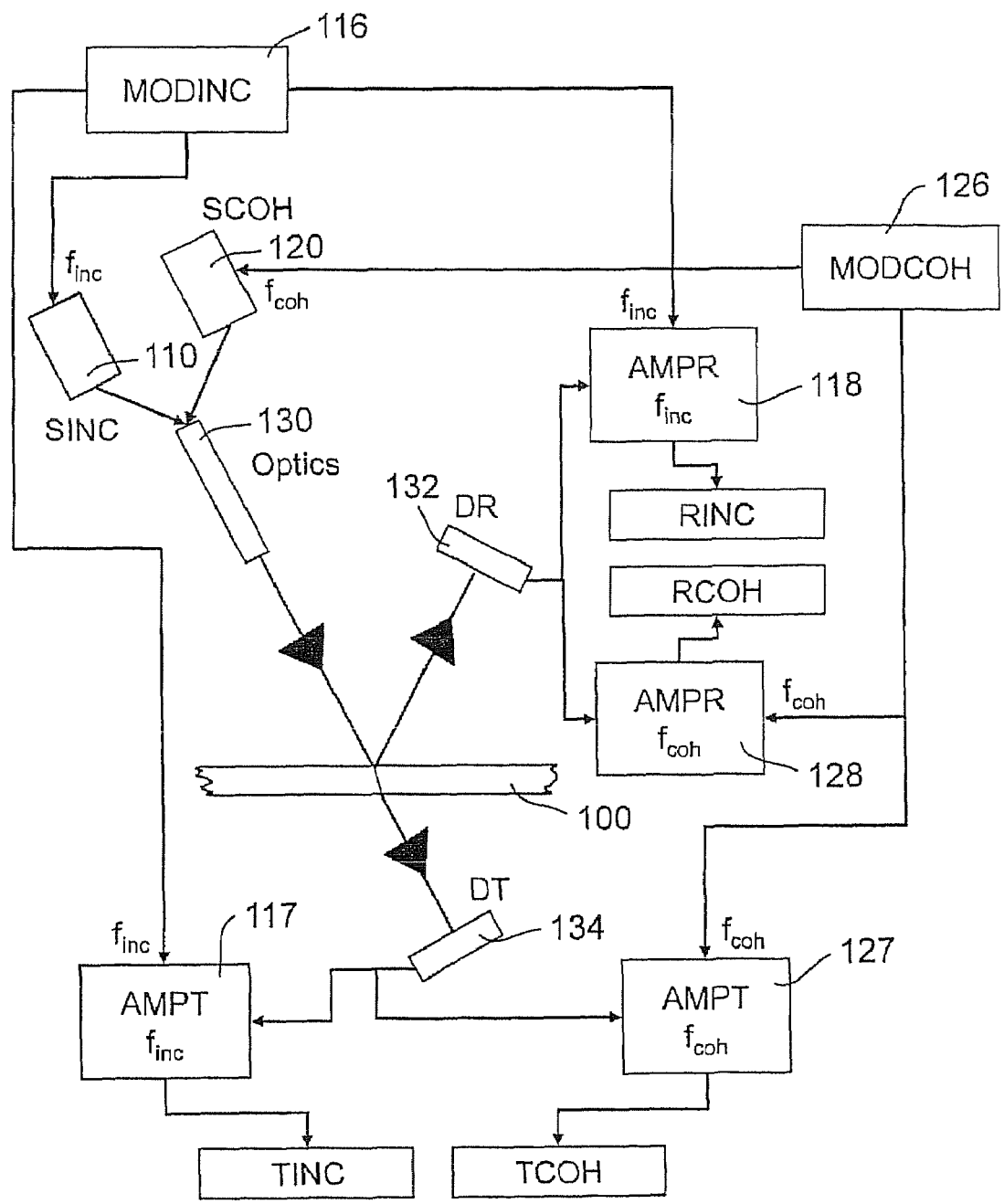
FIG. 21 illustrates an exemplary illumination and detection arrangement.

FIG. 21 shows another exemplary optical configuration, where the energy from the two sources 110 and 120 passes through a common optical path 130 before illuminating the wafer, and also passes through common optical paths when it enters detection systems 132 and 134. In this case, the coherent and incoherent measurements can be performed with a simpler apparatus, even if the wavelength ranges of the sources 110 and 120 overlap. The optical filters in front of the detectors in 132 and 134 preferably have bandwidths that are sufficiently wide to allow both wavelength ranges to reach the detectors. One way of implementing this approach, yet still allowing for separately performing the coherent and incoherent measurements, is by modulating the output of the two sources of radiation with two different signals. In this case, the contributions of the light from the two sources can be distinguished even if both beams of light are sampled by just one detector. For example, the output of the source 110 can be modulated with a periodic signal from a modulator 108 with a frequency $f_{inc}$, and that of the source 120 can be modulated with a periodic signal from a modulator 118 with frequency $f_{coh}$. Various forms of modulation can be employed to produce light from either or both sources that varies in time. For example, sinusoidal modulation or a square-wave modulation may be employed. The two signals can be separated by coupling the output of the detectors to two lock-in amplifiers which selectively measure frequency components at the frequencies $f_{inc}$ and $f_{coh}$. For example, the output from the detector of reflected light 132 can be provided to the input of two lock-in amplifiers, 128 (AMPR:$f_{coh}$) and 118 (AMPR:$f_{inc}$). In this case, the lock-in amplifier AMPR:$f_{coh}$ is tuned to the frequency $f_{coh}$ and hence extracts the signal from the coherent light reflected from the wafer. The lock-in amplifier AMPR: $f_{inc}$ is tuned to the frequency $f_{inc}$ and hence extracts the signal from the incoherent light reflected from the wafer. Likewise, the output from the detector of transmitted light 134 can be provided to the input of two lock-in amplifiers, 127 (AMPT: $f_{coh}$) and 117 (AMPT:$f_{inc}$). In this case the lock-in amplifier AMPT:$f_{coh}$ is tuned to the frequency $f_{coh}$ and hence extracts the signal from the coherent light transmitted by the wafer. The lock-in amplifier AMPT:$f_{inc}$ is tuned to the frequency $f_{inc}$ and hence extracts the signal from the incoherent light transmitted by the wafer.

The exemplary scheme in FIG. 21 presents may advantageously reduce the number of light detectors and optical filters that need to be used to perform the measurements. It is also a convenient way of using a common set of optics for coupling light into and out of the chamber, and for ensuring that the two types of optical measurement (coherent and incoherent) are performed at the same location on the wafer surface. This latter point is especially powerful if the measurements are performed at similar wavelengths. This is because most optical components, such as lenses, display chromatic aberrations, which means that their focusing properties vary with wavelength. As a result, when light of multiple wavelengths is coupled through an optical system, the size, shape and locations of focused regions of light may vary depending on the wavelength. Such problems can be decreased by the use of sophisticated optical designs, or through the use of reflective optics, but these approaches are typically more complicated and may be expensive.

In contrast, the method described here can use light at similar wavelengths to perform the two types of measurement, so that the measurements are performed in practically identical locations on the wafer, with practically identical size and shape of the probed region. In one example, the source 120 can be a semiconductor laser that emits light containing a range of wavelengths less than ~1 nm, centered on a wavelength of 1550 nm. For high-coherence measurements, the wavelength range should be even smaller, e.g. <0.5 nm. Such a source can have a coherence length greater than the thickness of the optical slab, and hence can be effectively used to monitor changes in the optical thickness of the slab. The source 110 can be a light-emitting diode, which emits light containing a range of wavelengths greater than 2 mm, also centered on a wavelength around 1550 nm. For highly incoherent measurements, the wavelength range should be even greater, e.g. >5 nm. Such a source can have a coherence length much smaller than the thickness of the optical slab, and hence can be effectively used to monitor changes in the optical absorption of the slab. Both sources can be conveniently modulated by electrical signals. The detectors 132 and 134 can be photodetectors, such as InGaAs photodiodes.

Although in the last example the two sources were centered in the same wavelength region, the principles of the approaches described here may still be applied when there is the centre wavelengths are different. In some cases, it may be preferred to use two wavelengths where the absorbing layer in the wafer exhibits significant differences in optical absorption at the two wavelengths. For example, it may be preferable that the absorption is relatively high for the purposes of accurately measuring the degree of absorption in the absorbing layer, yet simultaneously preferable for the absorption to be relatively low at the wavelength used to track the changes in the optical thickness of the layer. In such a case, two different wavelengths may be selected that meet these two criteria. For example, when applying the approach with a structure such as that in FIG. 19(a), e.g. a silicon wafer that is ~775 μm thick, it could be convenient to use a wavelength ~1050 nm to determine the absolute temperature of the wafer when it is around ~100° C., and then to use a high-coherence light source with a wavelength ~1550 nm to track the change in wafer temperature as the wafer is heated. When wavelengths that are very different are used, it may become more desirable to use the approach shown in FIG. 20, with separate light sources and detectors. In some embodiments, the optics can be arranged so that the regions sampled on the wafer can be very close together if necessary. This may be useful, in order to reduce errors in the temperature calibration.

An alternative approach is to ensure that wafer is rotating, and to make measurements at the same radius on the wafer. Another approach is to use just one set of detection optics, but to provide a filter with a tunable band-pass in front of the detectors. Various such filters are available, such as monochromators and other devices that can scan through a spectrum of light, variable wavelength filters, switched filters etc. The detection system can also include multiple detectors combined with separate filters or a spectrally dispersive element, such as a grating or a prism, which separate the wavelength components in the light and guide them to different detectors. It will be appreciated that various embodiments may also utilize a filter that passes both wavelength components while rejecting stray light, for example.

When the wafer that is being heated can be specially selected, for example, to serve as a temperature calibration standard, it is possible to use one wavelength region for both measurements of absorption and optical thickness, but to employ a composite wafer structure, where a layer that is used for the optical thickness measurement is relatively transparent at a given wavelength and a second layer that is used for the optical absorption measurement is relatively absorbing at the same wavelength. Such structures can take the forms suggested in FIGS. 19(b) and 19(c). In other embodiments, the layer used for one of the measurements can actually include the second layer. For example, a wafer in accordance with FIG. 19(c), may comprise a structure where the layer with temperature dependent optical absorption is a silicon substrate that has a substrate thickness $d_{sisub}$~750 μm thick, and which is relatively lightly-doped, for example with a resistivity >0.5 Ωcm. The layer with temperature dependent optical thickness can also be lightly doped silicon, with a similar resistivity, but it could be thinner, with a surface layer thickness $d_{sisurf}$~25 μm thick. The separation layer between the two silicon layers can be a layer of silicon dioxide, which ensures that light can be reflected from the lower surface of the upper silicon layer. The silicon dioxide layer could be ~0.3 μm thick. In this structure, the optical absorption in the silicon can be probed by making a transmittance measurement. Now, in this case, since both silicon layers have very similar optical properties, both layers have temperature dependent absorption. Hence, this is an example the layer with temperature dependent absorption could be considered as being the entire wafer thickness, including both silicon films. Indeed, the optical thickness of both silicon layers is also a function of temperature. However, at high temperatures (e.g. >850° C.), very little of the light reflected at the back surface of the thicker, lower silicon layer can return to the upper surface of the wafer and hence it cannot effectively contribute to an interference effect between light reflected at the two outer surfaces of the wafer. On the other hand, light that is reflected at the back surface of the upper silicon layer (at the interface with the silicon dioxide) can return to the surface and interfere with that reflected at the upper surface of the upper silicon layer. Hence, an optical thickness measurement can be conveniently performed on the upper silicon film. This allows temperature measurements to be extended to temperatures above 850° C. It is convenient for the wavelength to be around 1550 nm, since the absorption in silicon is relatively low at this wavelength. Indeed, with this structure, it may be preferred to perform all the measurements using just a single light source. This is because the transmittance measurement that is used to deduce the absolute temperature of the wafer can be conducted at a temperature that is high enough for the interference effects to be negligible. That condition arises when very little of the light that is reflected from the back surface of the wafer gets back to the front surface of the wafer, because optical absorption is too strong. The condition is met at a temperature $T_{op}$ when the product of the optical absorption coefficient $\alpha(\lambda_S, T_{op})$ at the wavelength used for the transmission measurement, $\lambda_S$, and the combined thicknesses of the silicon films, $d_{sicomb} = d_{sisurf} + d_{sisub}$, is greater than ~3. In this case the fraction of the energy in a ray that is left after it passes through the thickness of the wafer is $\sim\exp(-\alpha(\lambda_S,T)d_{sicomb}) = \exp(-3) < 5\%$. If $\lambda_S$ is ~1550 nm, then at ~800° C. $\alpha(\lambda_S,T)$ is ~100 cm$^{-1}$. For a case where $d_{sicomb}$ is ~775 μm thick, $\alpha(\lambda_S, 800° C.)d_{sicomb}$ is ~7.8, and the criterion is easily met. However, the surface layer is still relatively transparent, because $\lambda(\lambda_S, 800° C.)d_{sisurf}$ is only ~0.25. Hence, in this case the transmittance measurements and the optical thickness measurements can both be performed with a coherent light source emitting light at a wavelength ~1550 nm. Although the illustration emphasizes the relative simplicity of such a scheme in terms of the number of components that are utilized, it also serves to show that the methods can be carried out using coherent light sources alone, if desired.

In principle, it is also possible to use just the coherent source to implement the method even when the interference effects are significant in transmittance or reflectance measurements. However, in this case, the optical absorption would be deduced from a more sophisticated analysis of the reflectance and transmittance signals, which takes into account the way that absorption attenuates the degree of interference observed between light reflected at two interfaces in the wafer. By deducing the degree of absorption, the absolute temperature can be established, with the interference being used to determine change(s) in temperature relative to the absolute temperature.

Figure 22:
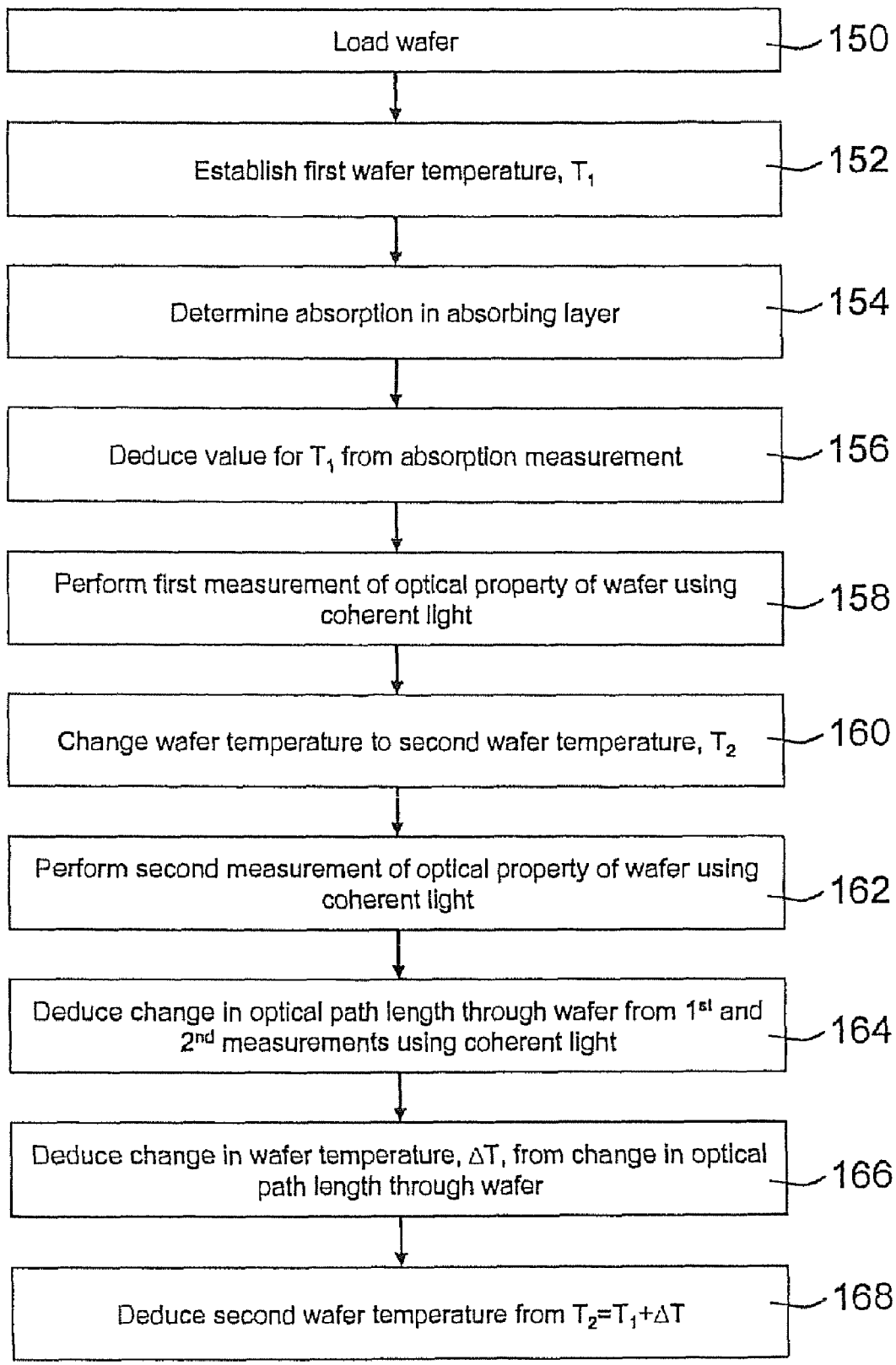
FIGS. 22 and 23 comprise flowcharts including exemplary steps for methods of determining wafer temperatures.
Figure 23:
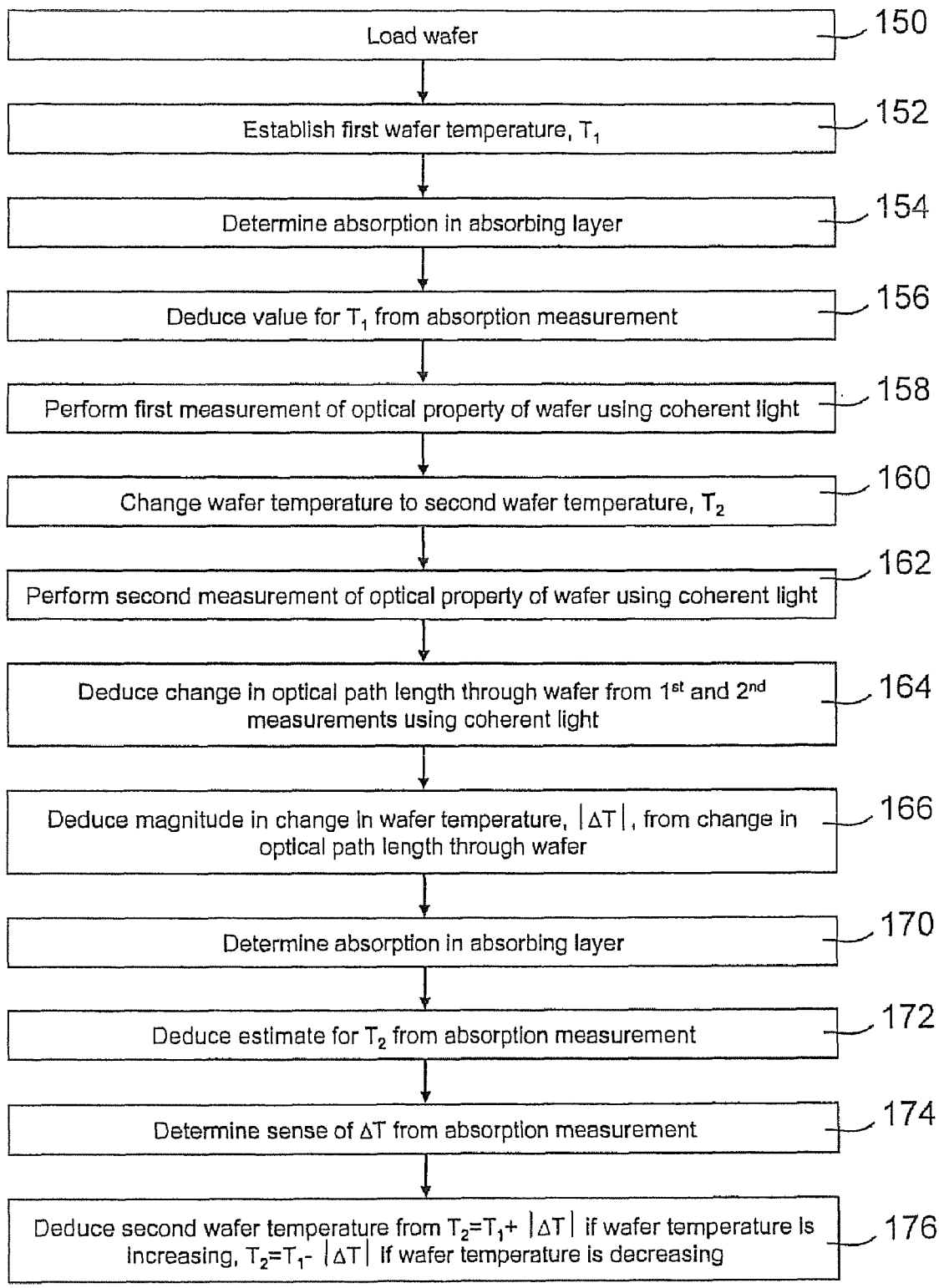

FIGS. 22 and 23 are flow diagrams giving examples of how the temperature of the wafer at a process temperature can be determined with a high degree of accuracy.

Turning to FIG. 22, a first measurement would typically be performed on a wafer that has been loaded into the process chamber as shown at step 150, either before the heating has started, or at a point relatively early in the heating cycle, at least at a temperature below the processing temperature that needs the tightest degree of temperature control. In this example, at step 152 the optical absorption in the wafer at a probe wavelength is determined at a first temperature, $T_1$. The optical absorption can be determined by means of a transmittance measurement or a reflectance measurement. Such measurements can be used to determine the optical absorption by a variety of methods, including, but not limited to, those described and discussed above in the present disclosure, and/or other methods, such as, for example, those discussed in U.S. patent application Ser. No. 10/178,950. Once the optical absorption has been determined, at step 156 the absolute temperature of the wafer, $T_1$, is established from the optical absorption with high accuracy. Such measurements are relatively easy to perform even on wafers that are quite thick, such as typical wafers used in device manufacturing, provided that $T_1$ is low enough for an acceptable amount of light to reach the back surface of the slab. This approach provides an initial measurement of the wafer temperature $T_1$.

Next, at step 158, a measurement affected by the optical thickness of at least some part of the wafer is performed. This measurement of an optical property of the wafer is preferably performed using a coherent measurement approach. The optical property would typically be the reflectance or the transmittance of the wafer, but the basic requirement is that the optical property that is measured is affected by an optical path length through a structure in the wafer. This optical path length is a function of wafer temperature, typically because of the effect of temperature on either the refractive index or the physical dimensions of at least part of the wafer. Once the optical property has been measured, the wafer temperature is changed at step 160 to a second temperature, $T_2$. At step 162, the coherent measurement is repeated, and the change in the optical property is determined at step 164. The change in the optical property is used at step 166 to deduce the temperature change that has occurred, $\Delta T$, as the wafer temperature changed from $T_1$ to $T_2$. This change can be deduced with great accuracy, because of the strong effect of optical path length changes on coherent measurements. Finally, an accurate absolute value for $T_2$ is obtained by adding $\Delta T$ to $T_1$ at step 168.

Coherent measurements of optical path length have sometimes been problematic with regard to sensing the sense of a temperature change (i.e whether temperature is rising or falling). This is because such measurements give rise to changes in optical properties that are highly oscillatory. If the wafer temperature changes at a point that corresponds to a maximum or a minimum in the oscillatory signal, then it can be difficult to tell whether the wafer is heating or cooling. Various approaches have been suggested for overcoming this problem, including the use of multiple wavelength measurements and examining the effects of wafer thickness variations on the interference effects. However, in embodiments of the present subject matter, such problems may be alleviated by ensuring that the optical absorption is estimated, either from a second measurement, or by analyzing the coherent measurement and deducing an absorption value. By sensing the change in absorption it is possible to get an immediate check on the sense of the temperature change, and hence the problem is resolved.

For example, the flow chart of FIG. 23 shows how the approach of FIG. 22 been adapted to perform a second measurement of absorption at the temperature $T_2$ at step 170 following step 166. The steps 150-166 may remain the same as in FIG. 22. The absorption measurement at step 170 can then be used to validate the direction of the temperature change from $T_1$ to $T_2$ by estimating the value for $T_2$ at step 172 using the absorption measurement. Using the temperature estimate and/or the absorption measurement, at step 174 a sense of the direction of $\Delta T$ (i.e. rising or falling) can be determined. For example, when the absorption measurement is performed using a silicon layer, any increase in absorption always corresponds to a rise in temperature. Therefore, in such cases, if the absorption at $T_2$ is greater than that at $T_1$, then the temperature has risen. Using that information, at step 176, the temperature $T_2$ may be deduced by adding or subtracting $\Delta T$ as appropriate. Although it may be difficult to perform the absorption measurement (for example when signal levels are very low due to very strong absorption at high temperature), an accurate value is not necessary for the purpose sensing the direction of the temperature change. The estimate need only be accurate enough so that it can be determined whether the temperature is rising or falling. Additionally, the wavelength of radiation used to sense absorption can be selected to facilitate that task; it need not be the same as the wavelength used to determine the optical path length changes.

The approaches for determining temperature changes can be repeated and hence the temperature of a wafer can be tracked throughout a heating cycle. This can be done with an initial cross-calibration to an absolute temperature measurement, for example, through the optical absorption measurement. It can also be done with periodic cross-checks against measurements based on optical absorption, which can also be used to confirm the sense of the temperature changes. In many processes, the difficulties with the sense of temperature changes can be eliminated, because it is possible to monitor the heating power applied to the wafer (and any other factors that could impact heat transfer, such as the nature of any gas flows that could transfer heat to or from the wafer) and hence predict the sense of the temperature change. In particular, in a heating cycle where the measurements are performed in order to calibrate another temperature sensor, such as a pyrometer, there is extra flexibility. For example, the heating system may be programmed to deliver a continuously rising output of heating power to a wafer that starts at a temperature that is below that of the processing environment. In this case it is known that the wafer temperature will be continuously rising in response to the heating power. Likewise if the heating power is shut off, the wafer will start to cool (although care should be taken to ensure that the thermal time-constants of components, such as heating lamps, are taken into consideration). Measurements performed during the cooling curve can then be based on the assumption that the wafer temperature is decreasing. Indeed, the cooling trend could also be confirmed by other means, even by using the uncalibrated output of a pyrometer, since the signal strength of radiation thermally emitted by the wafer decreases with the temperature of the wafer.

It is appreciated by persons skilled in the art that the presently disclosed subject matter is not limited in scope by what has been particularly shown and described above, which constitute various examples. Rather, as set forth in the attached claims, the scope includes both combinations and sub-combinations of various features discussed herein, along with such variations and modifications as would occur to a person of skill in the art.

The invention claimed is:

1. A method of calibrating a temperature measurement device, the method comprising:
    directing light towards a first side of a calibration wafer, at least part of the calibration wafer having an optical absorption at a first known wavelength that varies with temperature and having an optical path length at a second known wavelength that varies with temperature;
    heating the calibration wafer;
    measuring an absorption characteristic of the calibration wafer at the first known wavelength to determine an absolute temperature value;
    making at least a first measurement and a second measurement of a value of an optical property that is sensitive to the optical path length of the light being directed through at least part of the calibration wafer, wherein the first measurement and the second measurement are performed at different temperatures of the calibration wafer;
    determining a change in temperature based upon the measured values that are sensitive to the optical path length through at least part of the calibration wafer; and
    calibrating a temperature measurement device by correlating readings of the temperature measurement device with both the measurement of the absolute temperature value and the measurement of the change in temperature.

2. A method as defined in claim 1, wherein the calibration wafer comprises only a single slab of material.

3. A method as defined in claim 1, wherein the calibration wafer has two layers.

4. A method as defined in claim 1, wherein the absorption characteristic at the first known wavelength and the variation of the optical path length at the second known wavelength are measured by detecting light transmitted through the calibration wafer at the respective wavelengths.

5. A method as defined in claim 1, wherein at least some of the light that is directed towards the first side of the calibration wafer is emitted by an incoherent light source.

6. A method as defined in claim 1, wherein the calibration wafer comprises silicon.

7. A method as defined in claim 1, wherein the temperature measurement device comprises a pyrometer.

8. A method as defined in claim 1, wherein the second known wavelength is about 1.55 microns.

9. A method as defined in claim 1, wherein at least some of the light that is directed towards the first side of the calibration wafer is emitted by a coherent light source.

10. A method as defined in claim 1, wherein the light that is directed towards the first side of the calibration wafer comprises light emitted by an incoherent light source at the first known wavelength and light emitted by a coherent light source at the second known wavelength.

11. A method as defined in claim 1, wherein the measurement of the absolute temperature value and the measurement of the change in temperature are conducted while the calibration wafer is rotating and wherein both measurements are taken at the same radius on the calibration wafer.

12. A method as defined in claim 1, wherein a temperature scale is created based on both the measurement of the absolute temperature and the measurement of the change in temperature, the temperature scale being used to calibrate the temperature measurement device.

13. A method of calibrating a temperature measurement device, the method comprising:
    measuring transmission through a calibration wafer at a first wavelength to determine at least one absolute temperature of the wafer as the wafer is heated;
    measuring transmission through the calibration wafer at a second wavelength to determine at least one change in temperature of the wafer as the wafer is heated, the second wavelength being selected such that oscillations occur between maxima and minima in reflectance or transmittance of the wafer as the temperature of the wafer increases; and
    calibrating a temperature measurement device by combining the determined absolute temperature with the determined change in temperature of the wafer.

14. A method as defined in claim 13, wherein the calibration wafer comprises only a single slab of material.

15. A method as defined in claim 13, wherein the calibration wafer has two layers.

16. A method as defined in claim 13, further comprising the step of directing light towards a first side of the calibration wafer at the first wavelength and at the second wavelength, the light being directed towards the first side of the calibration wafer at the first wavelength being emitted by an incoherent light source and wherein light that is directed towards the first side of the calibration wafer at the second wavelength is emitted by a coherent light source.

17. A method as defined in claim 13, wherein the calibration wafer comprises silicon.

18. A method as defined in claim 13, wherein the temperature measurement device comprises a pyrometer.

19. A method as defined in claim 13, wherein the second known wavelength is about 1.55 microns.

20. A method as defined in claim 13, wherein the measurement of the absolute temperatures and the measurement of the changes in temperature are conducted while the calibration wafer is rotating and wherein both measurements are taken at the same radius on the calibration wafer.

21. A method as defined in claim 13, wherein the calibration wafer has a composition that is known ahead of the calibration process so that the optical properties of the wafer are known.

22. A method as defined in claim 13, wherein the transmission measurements at the second wavelength are sensitive to an optical path length of light at the second wavelength through the wafer.

23. A method as defined in claim 13, wherein determined absolute temperatures at the first wavelength are based upon an optical absorption of the wafer at the first wavelength.

24. A method as defined in claim 13, wherein the first wavelength and the second wavelength are the same.

25. A method as defined in claim 13, wherein a plurality of changes in temperature of the wafer are determined at the second wavelength.

26. A method as defined in claim 25, wherein a temperature scale is created for the calibration wafer by combining the determined absolute temperature with the determined changes in temperature of the wafer and the temperature scale is used to calibrate the temperature measurement device.

* * * * *